US010165510B2

(12) United States Patent
Itagaki et al.

(10) Patent No.: US 10,165,510 B2
(45) Date of Patent: Dec. 25, 2018

(54) WIRELESS COMMUNICATION DEVICE, WIRELESS COMMUNICATION METHOD, AND WIRELESS COMMUNICATION SYSTEM

(71) Applicant: SONY CORPORATION, Tokyo (JP)

(72) Inventors: Takeshi Itagaki, Saitama (JP); Masanori Sato, Tokyo (JP); Katsutoshi Itoh, Tokyo (JP)

(73) Assignee: SONY CORPORATION, Tokyo (JP)

( * ) Notice: Subject to any disclaimer, the term of this patent is extended or adjusted under 35 U.S.C. 154(b) by 74 days.

(21) Appl. No.: 15/304,596

(22) PCT Filed: Mar. 4, 2015

(86) PCT No.: PCT/JP2015/056404
§ 371 (c)(1),
(2) Date: Oct. 17, 2016

(87) PCT Pub. No.: WO2015/163013
PCT Pub. Date: Oct. 29, 2015

(65) Prior Publication Data
US 2017/0041867 A1  Feb. 9, 2017

(30) Foreign Application Priority Data

Apr. 25, 2014  (JP) ................................ 2014-091650

(51) Int. Cl.
*H04W 52/02* (2009.01)
*H04W 4/04* (2009.01)
(Continued)

(52) U.S. Cl.
CPC .......... *H04W 52/02* (2013.01); *H04B 17/318* (2015.01); *H04L 43/16* (2013.01);
(Continued)

(58) Field of Classification Search
CPC ....... H04W 4/04; H04W 52/02; H04W 52/10; H04W 88/08; H04W 52/245; H04W 52/283; H04W 72/04; H04W 88/02; H04W 52/04; H04W 52/146; H04W 52/143; H04W 72/042; H04W 72/082;
(Continued)

(56) References Cited

U.S. PATENT DOCUMENTS 6,618,427 B1 * 9/2003 Yasaki .................. H04W 52/34
370/252
2002/0013156 A1 * 1/2002 Yamamoto ............... H04B 7/01
455/522
(Continued)

FOREIGN PATENT DOCUMENTS

JP   05-244056 A   9/1993
JP   11-341553 A   12/1999
(Continued)

*Primary Examiner* — Jamal Javaid
*Assistant Examiner* — Rosene Clark
(74) *Attorney, Agent, or Firm* — Xsensus, LLP

(57) ABSTRACT

[Object] To provide a wireless communication device, wireless communication method, and a wireless communication system capable of further reducing power consumption of a mobile station. [Solution] Provided is a wireless communication device including a wireless communication unit configured to perform wireless communication with a base station, a measurement unit configured to detect a predetermined signal pattern from a signal received by the wireless communication unit and measure reception power of the signal including the predetermined signal pattern, and a control unit configured to control at least one of a packet transmission time length and transmission power when the wireless communication unit transmits a signal, based on pre-decided transmission power of the base station and the reception power measured by the measurement unit.

18 Claims, 19 Drawing Sheets

(51) Int. Cl.
*H04W 52/10* (2009.01)
*H04B 17/318* (2015.01)
*H04L 12/26* (2006.01)
*H04W 52/24* (2009.01)
*H04W 52/28* (2009.01)
*H04W 88/02* (2009.01)
*H04W 88/08* (2009.01)

(52) U.S. Cl.
CPC ............ *H04W 4/04* (2013.01); *H04W 52/10* (2013.01); *H04W 52/245* (2013.01); *H04W 52/283* (2013.01); *H04W 88/02* (2013.01); *H04W 88/08* (2013.01); *Y02D 70/00* (2018.01); *Y02D 70/142* (2018.01); *Y02D 70/144* (2018.01); *Y02D 70/146* (2018.01); *Y02D 70/162* (2018.01); *Y02D 70/164* (2018.01); *Y02D 70/168* (2018.01); *Y02D 70/21* (2018.01)

(58) Field of Classification Search
CPC ...... H04B 17/318; H04B 7/005; H04B 7/216; H04L 43/16; Y02B 60/50; Y02D 70/142
See application file for complete search history.

(56) References Cited

U.S. PATENT DOCUMENTS

| | | | |
|---|---|---|---|
| 2002/0094836 A1* | 7/2002 | Nakamura | H04W 52/12 455/522 |
| 2007/0254596 A1* | 11/2007 | Corson | H04L 5/0035 455/68 |
| 2011/0207468 A1* | 8/2011 | Nakamura | H04W 52/0274 455/450 |
| 2011/0274059 A1* | 11/2011 | Brown | H04L 27/0008 370/329 |
| 2014/0153536 A1* | 6/2014 | Ouchi | H04W 52/146 370/329 |
| 2014/0226498 A1* | 8/2014 | Soliman | H04W 52/362 370/252 |

FOREIGN PATENT DOCUMENTS

| | | |
|---|---|---|
| JP | 2002-246982 A | 8/2002 |
| JP | 2011-142653 A | 7/2011 |
| JP | 2013-517742 A | 5/2013 |
| WO | 2013/018858 A1 | 2/2013 |

* cited by examiner

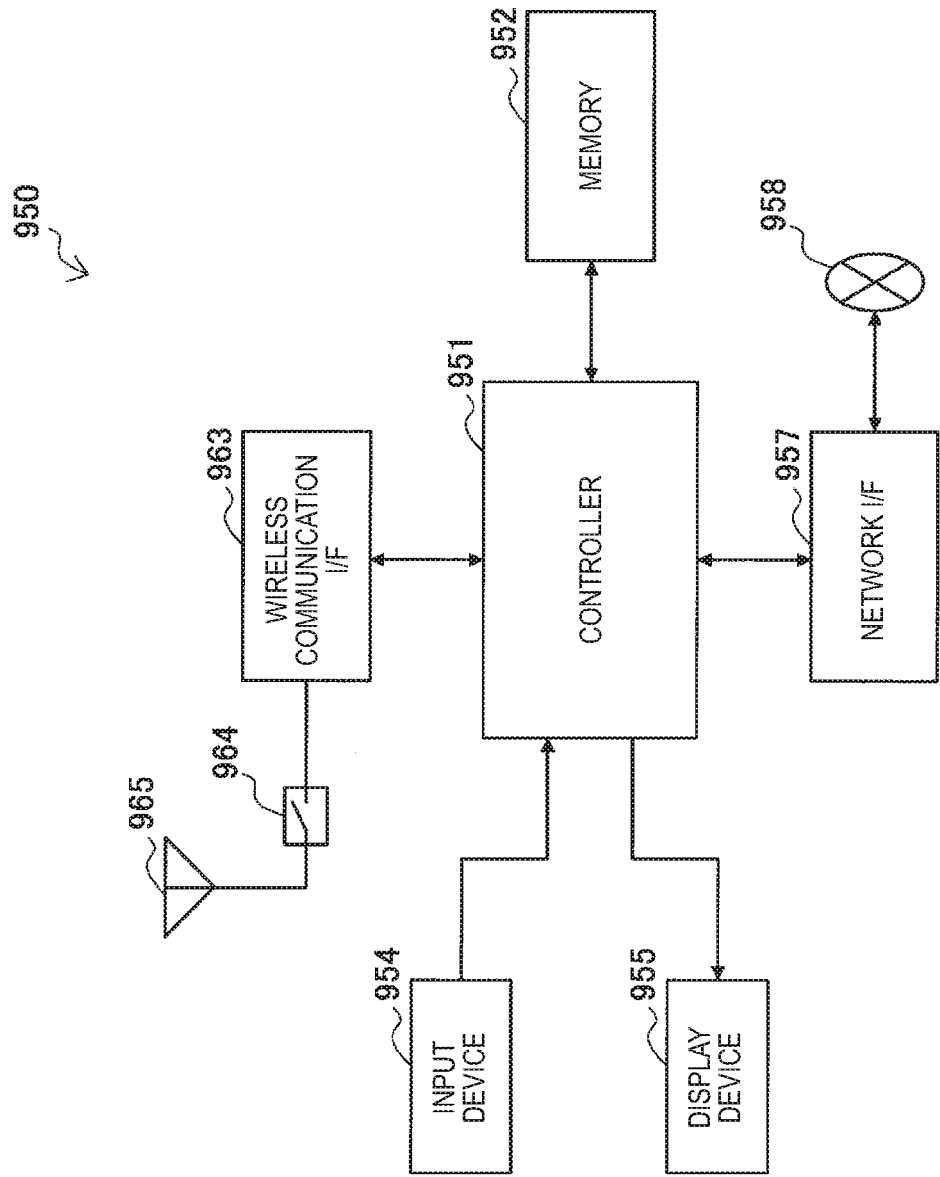

WIRELESS COMMUNICATION DEVICE, WIRELESS COMMUNICATION METHOD, AND WIRELESS COMMUNICATION SYSTEM

CROSS REFERENCE TO RELATED APPLICATIONS

This application is a U.S. National Phase of International Patent Application No. PCT/JP2015/056404 filed on Mar. 4, 2015, which claims priority benefit of Japanese Patent Application No. JP 2014-091650 filed in the Japan Patent Office on Apr. 25, 2014. Each of the above-referenced applications is hereby incorporated herein by reference in its entirety.

TECHNICAL FIELD

The present disclosure relates to a wireless communication device, a wireless communication method, and a wireless communication system.

BACKGROUND ART

In recent years, technologies for wireless sensor networks have actively been developed. Wireless sensor networks are technologies for collecting people's behavior information or surrounding environment information, for example, by connecting wireless nodes in which wireless devices and sensor devices such as position sensors or temperature sensors are combined, to wireless networks. Wireless sensor networks are expected to be utilized in various fields such as monitoring systems and home automation. This is because advantages such as flexibility of reduction in cost, expansion of sensing ranges, and changes in networks can be expected when sensor networks are constructed with wireless communication.

Wireless sensor network systems can be considered to be designed variously depending on which is preferred among requests of applications to be applied. Examples of the requests include the amount of information of data and a direction of the data to be exchanged, a scale of the capacity of wireless nodes per base station, an extent of a communicable area, complexity of signal processing on a wireless node side, a transmission delay time, tolerance for mobility of a wireless node, reliability of data transmission, and addition of a base station or a wireless node. Here, since wireless nodes are assumed to be installed in various locations for a long time, the wireless nodes can necessarily operate with batteries for a long time to achieve low power consumption. Therefore, it is necessary to develop technologies for realizing low power consumption of the wireless nodes.

For example, the following Patent Literature 1 discloses a technology related to transmission power control performed for a reception side to measure an average reception bit error rate in call channels which are being used and increase or decrease transmission power of a transmission side to maintain an appropriate average reception bit error rate.

CITATION LIST

Patent Literature

Patent Literature 1: JP H5-244056A

SUMMARY OF INVENTION

Technical Problem

However, according to the technology disclosed in the foregoing Patent Literature 1, in order for a base station to perform transmission power control of a mobile station, it is necessary to transmit a control message for giving an instruction to increase or decrease transmission power to the base station. Further, it is necessary for the mobile station to receive the control message and perform a process of interpreting content of the control message. Accordingly, power consumption used in this process is necessary in the mobile station.

Accordingly, it is desirable to provide a novel and improved wireless communication device, a novel and improved wireless communication method, and a novel and improved wireless communication system capable of further reducing power consumption of a mobile station.

Solution to Problem

According to the present disclosure, there is provided a wireless communication device including a wireless communication unit configured to perform wireless communication with a base station, a measurement unit configured to detect a predetermined signal pattern from a signal received by the wireless communication unit and measure reception power of the signal including the predetermined signal pattern, and a control unit configured to control at least one of a packet transmission time length and transmission power when the wireless communication unit transmits a signal, based on pre-decided transmission power of the base station and the reception power measured by the measurement unit.

According to the present disclosure, there is provided a wireless communication method performed by a wireless communication device which performs wireless communication with a base station, the wireless communication method including detecting a predetermined signal pattern from a received signal and measuring reception power of the signal including the predetermined signal pattern, and controlling at least one of a packet transmission time length and transmission power when transmitting a signal, based on pre-decided transmission power of the base station and the measured reception power.

According to the present disclosure, there is provided a wireless communication system including a base station, and a wireless communication device. The base station includes a first wireless communication unit configured to transmit a signal including a predetermined signal pattern to the wireless communication device, and the wireless communication device includes a second wireless communication unit configured to perform wireless communication with the base station, a measurement unit configured to detect the predetermined signal pattern from the signal received by the second wireless communication unit and measure reception power of the signal including the predetermined signal pattern, and a control unit configured to control at least one of a packet transmission time length and transmission power when the second wireless communication unit transmits a signal, based on pre-decided transmission power of the base station and the reception power measured by the measurement unit.

Advantageous Effects of Invention

According to the present disclosure, as described above, it is possible to further reduce power consumption of a mobile station.

Note that the effects described above are not necessarily limited, and along with or instead of the effects, any effect that is desired to be introduced in the present specification or other effects that can be expected from the present specification may be exhibited.

BRIEF DESCRIPTION OF DRAWINGS

FIG. 19 is a block diagram showing an example of a schematic configuration of a wireless access point.

DESCRIPTION OF EMBODIMENT(S)

Hereinafter, preferred embodiments of the present disclosure will be described in detail with reference to the appended drawings. In this specification and the drawings, elements that have substantially the same function and structure are denoted with the same reference signs, and repeated explanation is omitted.

The description will be made in the following order.
1. Overview
2. First Embodiment
2-1. Configuration example of base station
2-2. Configuration example of wireless node
2-3. Operation process
2-4. Radio resource selection methods
3. Second Embodiment
4. Third Embodiment
5. Application examples
6. Conclusion <1. Overview>

First, an overview of a wireless communication system according to an embodiment of the present disclosure will be described with reference to FIGS. 1 to 3.

Figure 1:
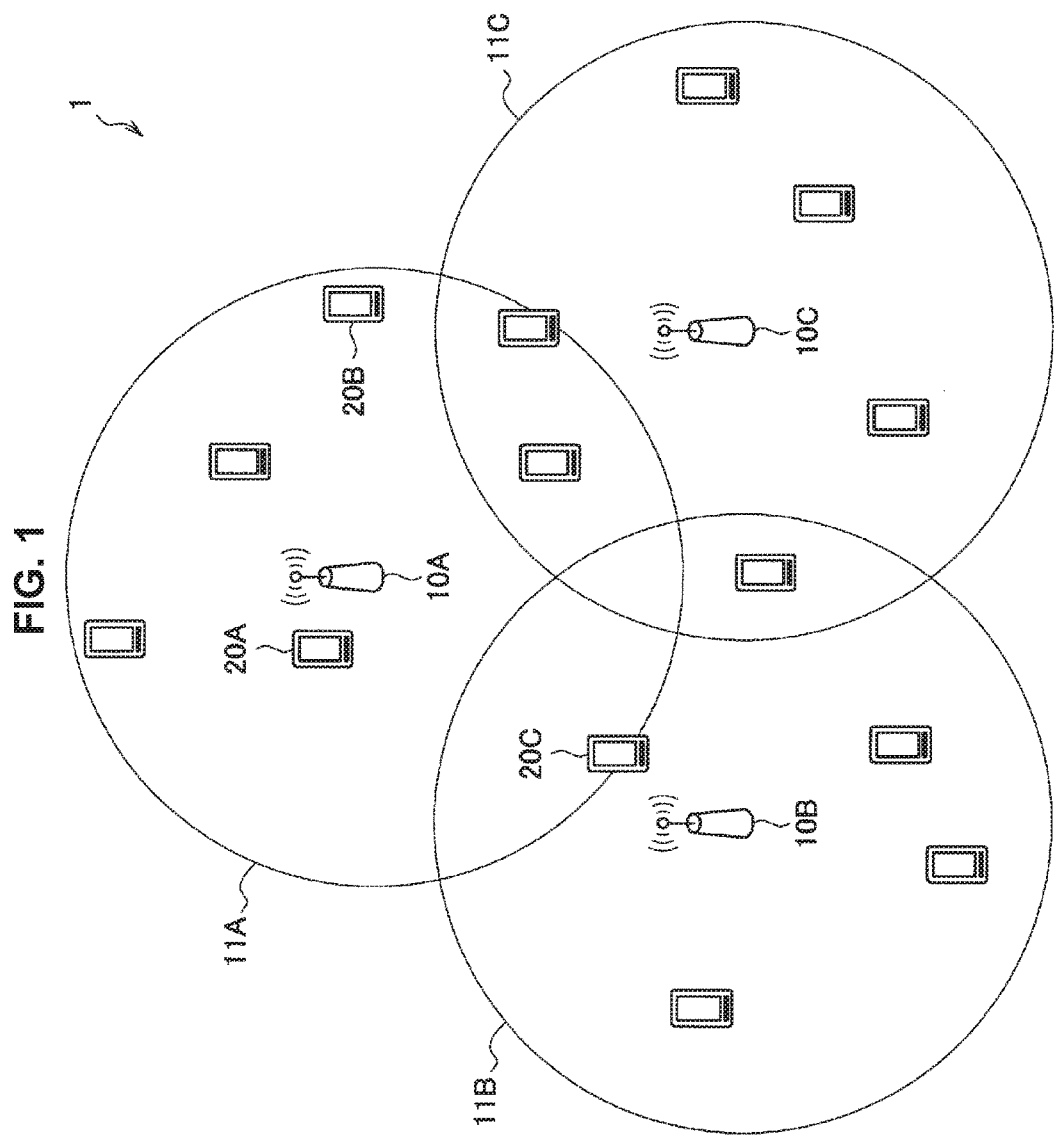
FIG. 1 is a diagram showing the entire configuration of a wireless communication system according to an embodiment.

FIG. 1 is a diagram showing the entire configuration of a wireless communication system according to an embodiment. As shown in FIG. 1, a wireless communication system 1 includes base stations 10A, 10B, and 10C and wireless communication devices 20A, 20B, and 20C.

The base stations 10A, 20B, and 20C provide wireless communication services to one or more terminal devices located inside cells 11A, 11B, and 11C administrated by the base stations 10A, 10B, and 10C. For example, the base station 10A can communicate with the wireless communication devices 20A, 20B, and 20C located inside the cell 11A. The cells 11A, 11B, and 11C may be administrated in conformity with, for example, a wireless communication scheme such as any kind of wireless local area network (LAN) scheme such as Institute of Electrical and Electronics Engineers (IEEE) 802.11a, 11b, 11g, 11n, 11ac, or 11ad, a wireless personal area network (PAN) scheme such as ultra wideband (UWB) or Zigbee, or a wireless metropolitan area network (MAN) scheme such as IEEE 802.16. The base stations 10A, 10B, and 10C may be, for example, access points (APs) such as Wireless Fidelity (Wi-Fi) (registered trademark).

The wireless communication devices 20A, 20B, and 20C are each a device capable of performing wireless communication with the base station. In the example of FIG. 1, the wireless communication devices 20A, 20B, and 20C are each a wireless node that includes various sensors. The wireless node can receive a wireless signal transmitted from the base station within a range of the cell including the wireless node. The wireless node can transmit measurement data acquired by each sensor to the base station via an uplink from the wireless node to the base station.

Figure 2:
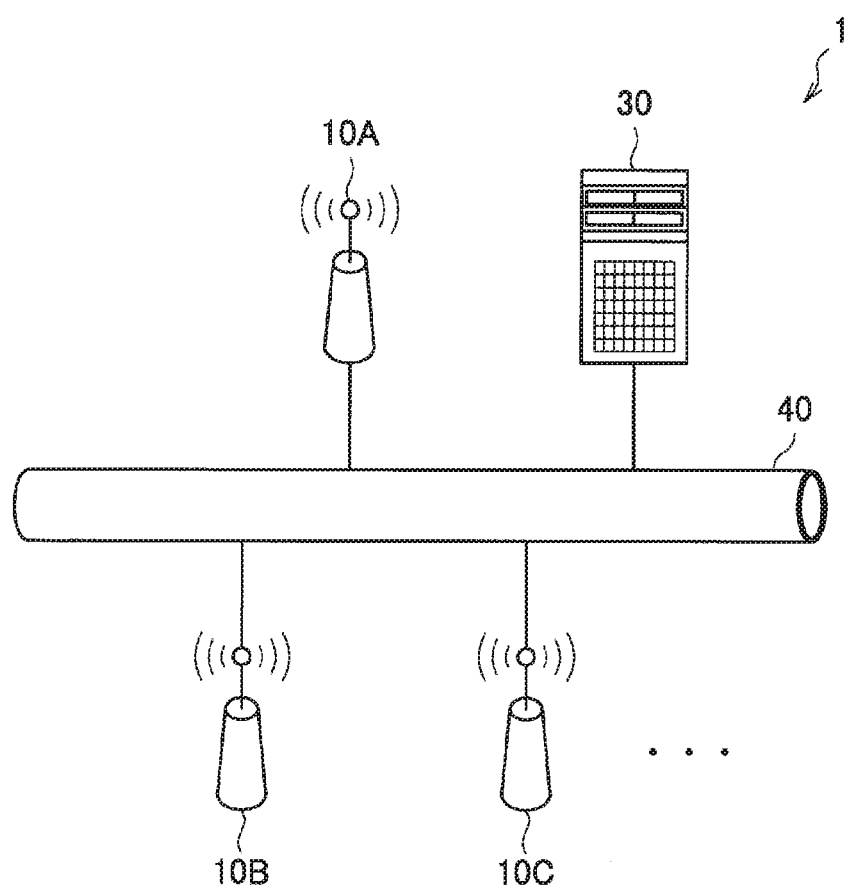
FIG. 2 is an explanatory diagram showing backbone communication in the wireless communication system according to the embodiment.

FIG. 2 is an explanatory diagram showing backbone communication in the wireless communication system 1 according to the embodiment. As shown in FIG. 2, the wireless communication system 1 further includes a management server 30 connected to the base stations 10A, 10B, and 10C via a backbone communication path 40. Each base station can communicate with the management server 30 and can also communicate with other base stations. The backbone communication path 40 may be realized through any kind of wired communication of, for example, a wired LAN, a telephone line, or the Internet network or may be realized through any kind of wireless communication described above. The management server 30 receives measurement data received from the wireless nodes 20 by the base stations 10A, 10B, and 10C via the backbone communication path 40. Then, the management server 30 aggregates the measurement data collected from the many wireless nodes 20 and performs various analysis processes.

In the present specification, when it is not necessary to distinguish the base stations 10A, 10B, and 10C from each other, the base stations 10A, 10B, and 10C are generally named the base stations 10 by omitting letters suffixed to the reference numerals. The same also applies to the other constituent elements (for example, the cells 11 and wireless nodes 20). The present disclosure is not limited to the example of FIG. 1. The wireless communication device 20 may be any kind of device such as a relay station that includes no sensor and relays wireless signals received from the wireless node 20 to the base station 10.

In the present disclosure, an example in which three requests in which the base station 10 can cover a large area (the cell 11), the base station 10 can accommodate many wireless nodes 20, and power consumption of the wireless node 20 is small are preferred as application requests to the above-described wireless communication system 1 is assumed. In order for the base station to cover a large area and accommodate many wireless nodes, a structure that performs multiplexing without collision of wireless transmission from many wireless nodes is necessary. In a general random access system, a collision probability can be reduced by suppressing transmission when a transmission source detects transmission of another wireless node or base station through carrier sensing. However, when an area is enlarged, a case in which the wireless nodes have a positional relation (referred to as a hidden terminal) in which mutual transmission radio waves may not be detected occurs often. In such a situation, carrier sensing does not work well and there is a high possibility of wireless transmission on uplinks from the wireless nodes colliding.

To avoid collision of mutual wireless transmission from the wireless nodes, for example, a technique for causing a base station to designate a transmission time of each wireless node or a technique for performing a protection sequence request to send/clear to send (RTS/CTS) transmission is considered. However, when such a technique is performed, exchange of messages between a wireless node and a base station increases. Therefore, an increase in a process in each wireless node and an increase in power consumption may be caused. Accordingly, the present disclosure provides a structure for realizing accommodation of many wireless node with constant communication quality by a base station without performing messaging between the base station and each wireless node while suppressing power consumption of each wireless node. The overview of the structure will be described with reference to FIG. 3.

Figure 3:
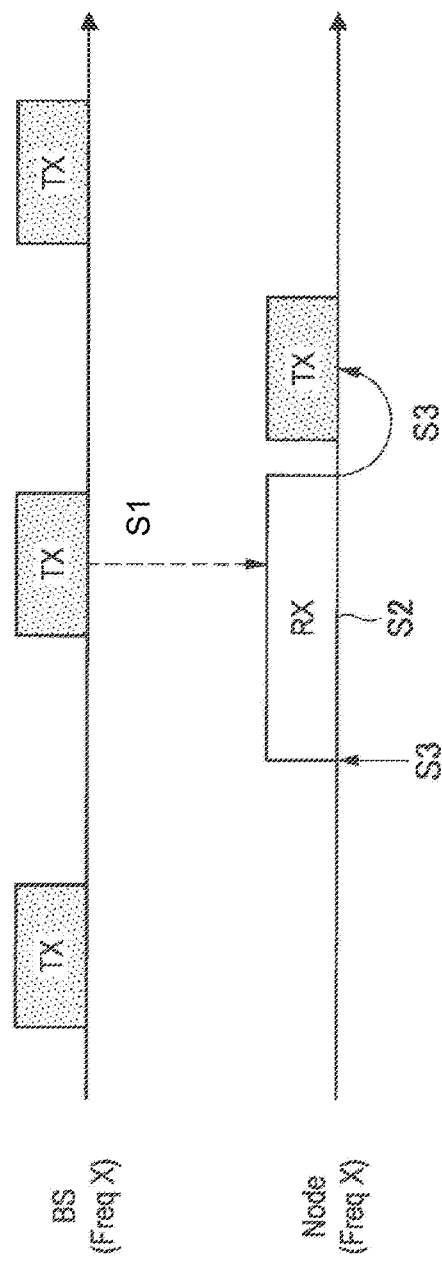
FIG. 3 is an explanatory diagram showing an overview of a transmission energy control process by the wireless communication system according to the embodiment.

FIG. 3 is an explanatory diagram showing an overview of a transmission energy control process by the wireless communication system 1 according to the embodiment. In FIG. 3, transmission and reception of signals performed between a base station (BS) 10 and the wireless node 20 are schematically shown. In the drawing, TX indicates signal transmission, RX indicates signal reception, and time flows from the left to the right. As shown in FIG. 3, the base station 10 repeatedly transmits a fixed pattern. The wireless node 20 has a function of detecting the fixed pattern transmitted by the base station 10. When a transmission request occurs by acquisition of measurement data or the like (step S1), the wireless node 20 detects the fixed pattern transmitted from the base station 10 and measures reception power of the fixed pattern (step S2). Then, the wireless node 20 controls transmission energy used by the wireless node 20 based on the measured reception power and transmits a wireless signal (step S3). In such a structure, the wireless node 20 can set transmission energy to an appropriate value without receiving and interpreting a control message from the base station 10. Since it is not necessary to transmit and receive a message and interpret the message and transmission of unnecessary high transmission energy is avoided, low power consumption of the wireless node 20 is realized. Further, when the above-described transmission energy control is realized in all of the wireless nodes 20, the reception level (reception power level) from each wireless node 20 in the base station 10 is constant. Therefore, a so-called perspective problem in which communication with the wireless node 20 distant from the base station 10 is difficult due to attenuation according to a distance is resolved, and thus constant communication quality is realized.

The overview of the wireless communication system according to the embodiment of the present disclosure has been described. Next, embodiments of the present disclosure will be described in detail.

<2. First Embodiment>

[2-1. Configuration Example of Base Station]

Figure 4:
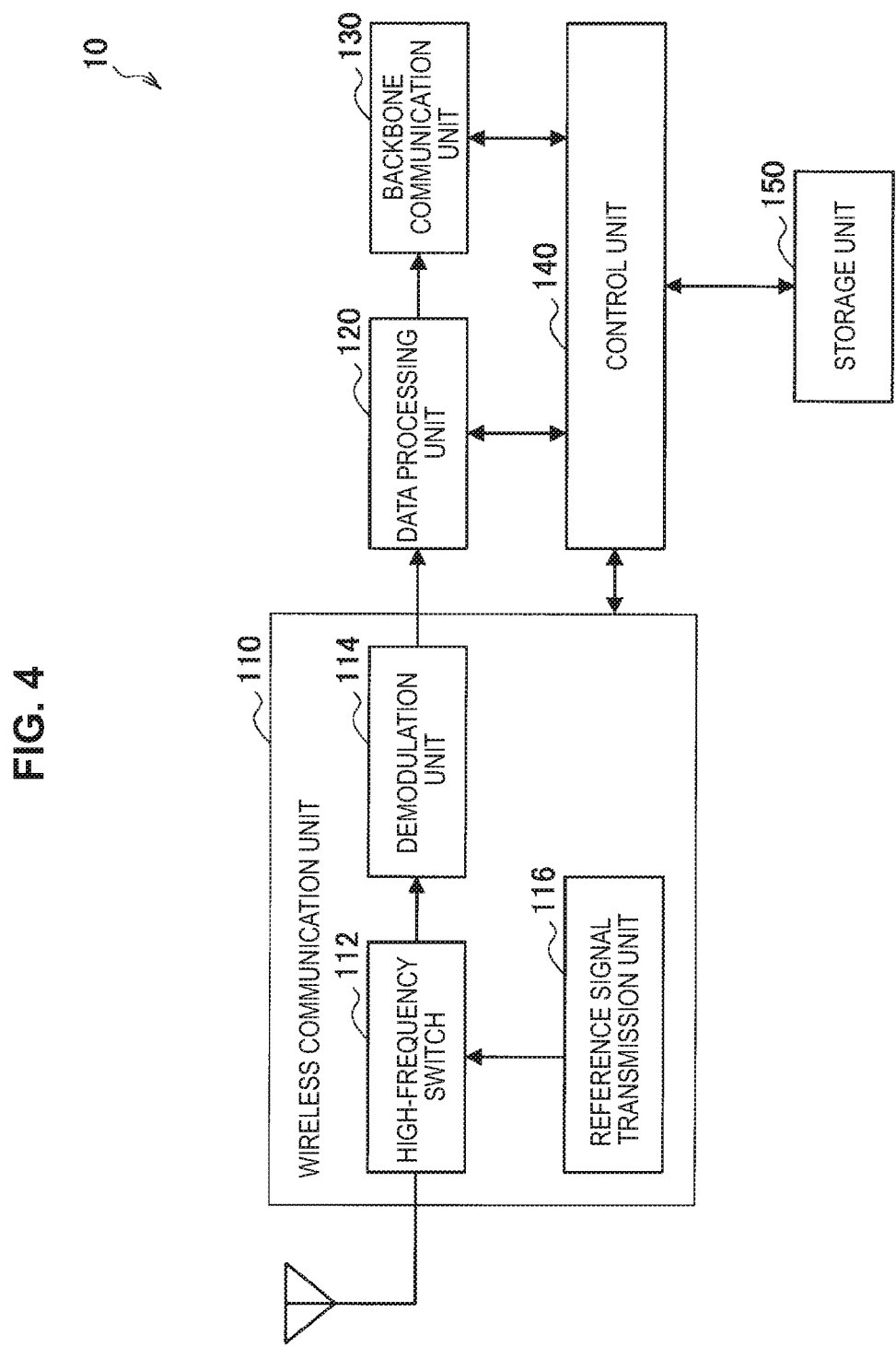
FIG. 4 is a block diagram showing an example of the internal configuration of a base station according to a first embodiment.

FIG. 4 is a block diagram showing an example of the internal configuration of the base station 10 according to a first embodiment. As shown in FIG. 4, the base station 10 includes a wireless communication unit 110, a data processing unit 120, a backbone communication unit 130, a control unit 140, and a storage unit 150.

(1) Wireless Communication Unit 110

The wireless communication unit (first wireless communication unit) 110 is a wireless communication interface which relays wireless communication with another device by the base station 10. In the embodiment, the wireless communication unit 110 performs wireless communication with the wireless node 20. The wireless communication unit 110 transmits a wireless signal including a reference pattern to the wireless node 20 via an antenna. Further, the wireless communication unit 110 receives a wireless signal including measurement data transmitted from the wireless node 20 via an antenna and outputs the wireless signal to the data processing unit 120. In the example shown in FIG. 4, one antenna is shared for transmission and reception, but respective separate antennas may be used. As shown in FIG. 4, the wireless communication unit 110 functions as a high-frequency switch 112, a demodulation unit 114, and a reference signal transmission unit 116. The wireless signal received by the base station 10 and including the measurement data is also referred to as a sensor signal below.

The high-frequency switch 112 connects the antenna to a reception system circuit and a transmission system circuit. For example, the high-frequency switch 112 performs switching of a received signal and a transmitted signal or switching of connection with a plurality of circuits corresponding to different communication standards. In the example shown in FIG. 4, the high-frequency switch 112 connects the antenna to the demodulation unit 114 and the reference signal transmission unit 116. The high-frequency switch 112 outputs the wireless signal received from the wireless node 20 by the antenna to the demodulation unit 114. The high-frequency switch 112 outputs the wireless signal output from the reference signal transmission unit 116 to the antenna to transmit the wireless signal to the wireless node 20.

(1-2) Demodulation Unit 114

The demodulation unit 114 is a reception system circuit of the wireless communication unit 110. For example, the demodulation unit 114 demodulates the wireless signal received from the wireless node 20 and outputs a demodulated signal to the data processing unit 120. When the wireless signal is directly spread by a spread code, the demodulation unit 114 may separate the sensor signal received from each wireless node 20 by performing despreading on the received wireless signal. The demodulation unit 114 is assumed to simultaneously perform despreading of a plurality of kinds of spread codes in parallel. When the base station 10 performs carrier sensing, the demodulation unit 114 measures a reception level at a frequency at which radio waves are scheduled to be emitted by the antenna and outputs a measurement result to the control unit 140.

(1-3) Reference Signal Transmission Unit 116

The reference signal transmission unit 116 is a transmission system circuit in the wireless communication unit 110. For example, the reference signal transmission unit 116 repeatedly transmits the wireless signal including a fixed pattern (predetermined signal pattern) known to the wireless node 20 located inside the cell 11 administrated by the base station 10 at a predetermined interval under the control of the control unit 140 via the antenna. In order for the wireless node 20 to easily detect the fixed pattern, the fixed pattern is preferably simple. Hereinafter, the fixed pattern is referred to as a reference pattern and a wireless signal including the reference pattern is referred to as a reference signal. The reference pattern may be known to all of the wireless nodes 20 included in the wireless communication system 1. The reference signal transmission unit 116 may have a function of a modulation unit. The reference signal transmission unit 116 can modulate the reference signal, for example, using any modulation scheme such as frequency shift keying (FSK), phase shift keying (PSK), or amplitude shift keying (ASK).

(2) Data Processing Unit 120

The data processing unit 120 performs various processes on a signal output from the demodulation unit 114. For example, the data processing unit 120 extracts the measurement data measured in the wireless node 20 from the signal output from the demodulation unit 114. The data processing unit 120 outputs the extracted measurement data to the backbone communication unit 130.

(3) Backbone Communication Unit 130

The backbone communication unit 130 is a communication interface with which the base station 10 relays communication between the management server 30 and another base station 10. For example, the backbone communication unit 130 transmits the measurement data output from the data processing unit 120 to the management server 30 via the backbone communication path 40 described with reference to FIG. 2. The backbone communication unit 130 may transmit or receive a control message for adjusting radio resources, reference patterns, or the like used by the base station 10 to and from another base station 10.

(4) Control Unit 140

The control unit 140 functions as an arithmetic processing device and a control device and has a function of controlling all of the operations in the base station 10 according to various programs. For example, the control unit 140 exchanges messages with other base stations 10 via the backbone communication unit 130 to perform various kinds of adjustment with the other base stations 10. For example, the control unit 140 adjusts a transmission timing of the reference signal, causes the fixed pattern used as the reference pattern to be identical to or different from the fixed patterns for the other base stations 10, or selects radio resources used to transmit the reference signal. The control unit 140 may control transmission power when the wireless communication unit 110 transmits the reference signal, so that the transmission power becomes a pre-decided transmission power. The pre-decided transmission power is referred to as standard transmission power. The standard transmission power is also known to the sides of the wireless nodes 20. The control unit 140 may perform carrier sensing. Specifically, the control unit 140 may suppress transmission of the wireless signal based on the measurement result of a reception level of the reference signal output from the demodulation unit 114.

(5) Storage Unit 150

The storage unit 150 stores various kinds of information to be used in the base station 10. For example, the storage unit 150 stores candidates of the fixed pattern usable as the reference pattern, candidates of the usable radio resources, and transmission power to be used. The control unit 140 selects the reference pattern and the radio resources to be actually used from the reference patterns and the radio resources stored in the storage unit 150. Additionally, the storage unit 150 may store candidates of the despread codes which are used in the demodulation unit 114. The storage unit 150 may store candidates of the radio resources which can be used to transmit the sensor signal by the wireless node 20.

The example of the internal configuration of the base station 10 according to the embodiment has been described. Next, an example of the internal configuration of the wireless node 20 according to the embodiment will be described with reference to FIG. 5.

[2-2. Configuration Example of Wireless Node]

Figure 5:
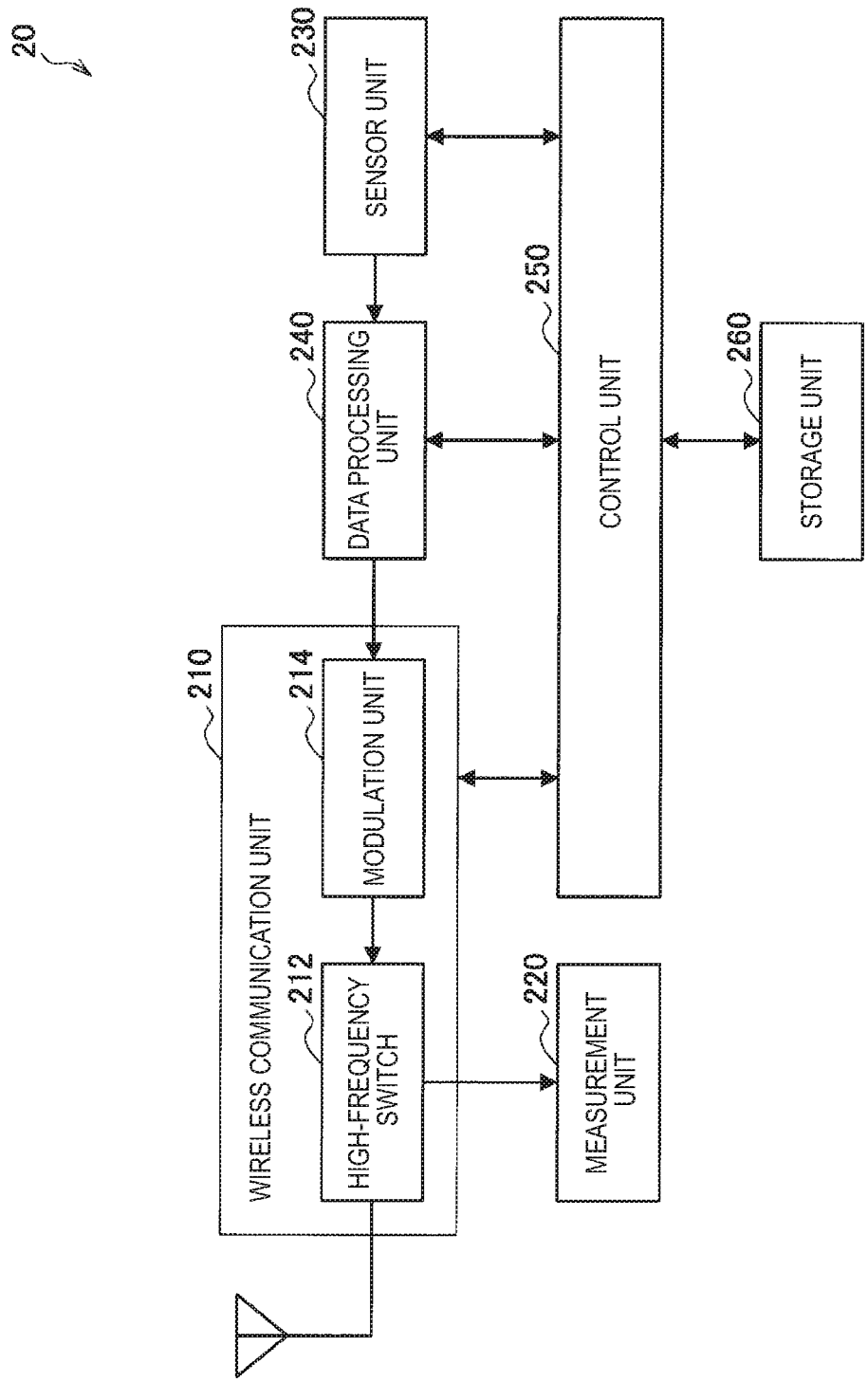
FIG. 5 is a block diagram showing an example of the internal configuration of a wireless node according to the first embodiment.

FIG. 5 is a block diagram showing an example of the internal configuration of the wireless node 20 according to the embodiment. As shown in FIG. 5, the wireless node 20 includes a wireless communication unit 210, a measurement unit 220, a sensor unit 230, a data processing unit 240, a control unit 250, and a storage unit 260.

(1) Wireless Communication Unit 210

The wireless communication unit (second wireless communication unit) 210 is a wireless communication interface which relays wireless communication with another device by the wireless node 20. In the embodiment, the wireless communication unit 210 performs wireless communication with the base station 10. For example, the wireless communication unit 210 receives the reference signal transmitted from the base station 10 via the antenna and outputs the reference signal to the measurement unit 220. Further, the wireless communication unit 210 transmits a sensor signal including measurement data acquired by the sensor unit 230 to be described below to the base station 10 via an antenna. In the example shown in FIG. 5, one antenna is shared for transmission and reception, but respective separate antennas may be used. As shown in FIG. 5, the wireless communication unit 210 functions as a high-frequency switch 212 and a modulation unit 214.

(1-1) High-frequency Switch 212

The high-frequency switch 212 connects the antenna to a reception system circuit and a transmission system circuit. For example, the high-frequency switch 212 performs switching of a received signal and a transmitted signal or switching of connection with a plurality of circuits corresponding to different communication standards. In the example shown in FIG. 5, the high-frequency switch 212 connects the antenna to the measurement unit 220 and the modulation unit 214. The high-frequency switch 212 outputs the wireless signal received by the antenna to the measurement unit 220. The high-frequency switch 212 outputs a wireless signal output from the modulation unit 214 to the antenna to transmit the wireless signal to the base station 10.

(1-2) Modulation Unit 214

The modulation unit 214 is a transmission system circuit of the wireless communication unit 210. For example, the modulation unit 214 modulates data output from the data processing unit 240 to generate a sensor signal and transmits the sensor signal (transmission signal) to the base station 10 via the antenna. Here, the modulation unit 214 transmits the sensor signal based on transmission setting designated by the control unit 250 to be described below. For example, the modulation unit 214 transmits the sensor signal in accordance with the designated transmission power and spread code length. Accordingly, the reception level in the base station 10 is the same as the reception level of the sensor signal received from another base station 10, and thus the so-called perspective problem is resolved. For example, the modulation unit 214 directly spreads the sensor signal (transmission signal) using the spread code. The spread code to be used may be allocated as a spread code unique to each wireless node 20. Since the perspective problem is resolved in the base station 10, the sensor signal transmitted from each wireless node 20 can be separated and acquired through despreading. The modulation unit 214 can perform modulation using any modulation scheme such as frequency shift keying (FSK), phase shift keying (PSK), or amplitude shift keying (ASK).

(2) Measurement Unit 220

The measurement unit 220 has a function of detecting the reference pattern from the wireless signal received by the wireless communication unit 210 and measuring the reception power of the reference signal. Specifically, the measurement unit 220 monitors the signal detected as an input from the antenna and performs correlation detection with the existing reference pattern. Then, the measurement unit 220 measures reception intensity of the reference signal including the detected reference pattern and outputs a measurement result to the control unit 250. When the wireless node 20 performs carrier sensing, the measurement unit 220 measures a reception level at a frequency at which radio waves are scheduled to be emitted by the antenna and outputs a measurement result to the control unit 250.

(3) Sensor Unit 230

The sensor unit 230 has a function of measuring a measurement target of the wireless node 20 and acquiring various kinds of measurement data. For example, the sensor unit 230 may be realized by a camera or a stereo camera, a microphone, a pressure sensor measuring a pressure, a positioning sensor acquiring a position using a global positioning system (GPS), a speed sensor measuring a speed and acceleration, a temperature sensor measuring temperature (ambient temperature), or a clock measuring time. The sensor unit 230 may be realized by a biological sensor measuring biological information such as myoelectricity, a nerve, a pulse, or body temperature. The sensor unit 230 may measure at least one of the listed measurement targets or may measure any other measurement target. The sensor unit 230 outputs measurement data indicating the measurement result to the data processing unit 240.

(4) Data Processing Unit 240

The data processing unit 240 performs various kinds of processes on the measurement data output from the sensor unit 230. For example, the data processing unit 240 packets the measurement data and outputs the packeted measurement data to the modulation unit 214.

(5) Control Unit 250

The control unit 250 functions as an arithmetic processing device and a control device and has a function of controlling all of the operations in the wireless node 20 according to various programs.

For example, the control unit 250 controls transmission energy when the wireless communication unit 210 transmits the signal based on the pre-decided transmission power of the base station 10 and the reception power of the reference signal measured by the measurement unit 220. The control unit 250 constantly maintains the reception level of the transmitted sensor signal in the base station 10 by controlling the transmission energy or avoids a collision with the sensor signal transmitted from the other wireless node 20 in the base station 10. When the control of the transmission energy for constantly maintaining the reception level in the base station 10 is executed in all of the wireless nodes 20 in the cell 11 of the base station 10, the reception level of the sensor signals from each wireless node 20 becomes the same as the wireless node 20, and thus the perspective problem is resolved. Therefore, even when the sensor signals transmitted from the wireless nodes 20 interfere with each other in the base station 10 and are received as the combined signals, the control unit 250 can separate the sensor signals by performing a despreading process on the combined signals and acquire the pieces of measurement data. Success of the acquisition of the measurement data from the received wireless signals is also simply referred to as success of reception of the sensor signals below. In this way, based on the reception power of the reference signal, the wireless node 20 can control the transmission energy without requesting a control message from the base station 10.

The control unit 250 decides the transmission energy to be used at the time of transmission of the sensor signal so that a reception level serving as a pre-decided standard of the base station 10 is satisfied based on a comparison result between the transmission power of the base station 10 and the reception power of the reference signal measured by the measurement unit 220. The reception level serving as the pre-decided standard of the base station 10 is also referred to as a target reception power below. By sharing the same target reception power in all of the wireless nodes 20, the constant reception level in the base station 10 is realized. Since an attenuation amount of radio waves increases as a distance increases, the reference signal transmitted from the base station 10 is attenuated according to a distance between the base station 10 and the wireless node 20. Similarly, the wireless signal transmitted from the wireless node 20 is attenuated according to the distance between the base station 10 and the wireless node 20. Accordingly, to cause the reception power in the base station 10 to become the target reception power, the control unit 250 decides large transmission energy when a difference between the reception power of the reference signal and the transmission power of the base station 10 is large, and decides small transmission energy when the difference is small.

Here, when the wireless node 20 is located in an overlapping portion of the plurality of cells 11, the wireless node 20 can receive the signals transmitted from the plurality of base stations 10. Therefore, the measurement unit 220 is assumed to detect the plurality of reference signals. In this case, the control unit 250 may decide the transmission energy to be used at the time of transmission of the sensor signal based on the highest reception power among the reception powers measured in the plurality of reference signals. That is, the control unit 250 decides the transmission energy based on the reference signal from the base station 10 located at a position with the shortest distance from the wireless node 20. Accordingly, the reception level serving as the standard is satisfied in the base station 10 located at the position with the shortest distance from the wireless node 20. Then, the reception level serving as the standard is not satisfied in the distant base station 10. Depending on a case, for example, the sensor signal from the wireless node 20 is treated as noise, and thus the reception of the sensor signal may fail. In this case, since the plurality of base stations 10 are prevented from receiving the same measurement data, the measurement data aggregated by the management server 30 is prevented from overlapping.

Here, the transmission energy controlled by the control unit 250 in accordance with the above-described method is decided in accordance with the transmission power and a packet transmission time length. Therefore, to realize the decided transmission energy, the control unit 250 controls at least one of the transmission power and the packet transmission time length. The control unit 250 realizes an increase and a decrease in the packet transmission time length by remaining modulation and a bandwidth unchanged and changing a spread code length used by the wireless communication unit 210. When the control unit 250 performs adjustment with the transmission power, the reception levels are the same despite the fact that reception of the sensor signals from the plurality of wireless nodes 20 collides in the base station 10 which is a reception side. On the other hand, when the control unit 250 performs adjustment with the packet transmission time length, the packet transmission time length from the wireless node 20 close to the base station 10 is shortened and an original collision probability decreases. The two adjustment methods each have advantages, and thus it is preferable to properly use the adjustment methods in accordance with a system administration policy or use the adjustment methods together.

When a transmission request occurs because of acquisition of the measurement data or the like, the control unit 250 controls the wireless communication unit 210 to perform transmission after the measurement is performed at least once by the measurement unit 220. Accordingly, the sensor signal transmitted from the wireless node 20 is ensured to be subjected to the transmission energy control based on the reception power of the reference signal. When the transmission request occurs, the control unit 250 may wait for the measurement by the measurement unit 220 or may use the previous measurement result for a predetermined time or until a predetermined number of transmissions after the measurement is performed once. Here, a case in which the measurement unit 220 fails to detect the reference pattern can also be considered. In this case, a notification unit (not shown) may notify an owner or a maintenance person of the wireless communication system 1 that the detection of the reference pattern has failed. For example, the notification unit can be realized by a blinking light-emitting diode (LED), a speaker emitting a notification sound, a vibrating motor, or the like.

The control unit 250 controls the wireless communication unit 210 to transmit the sensor signal using the radio resources which are not used for the base station 10 to transmit the reference signal. For example, the control unit 250 selects at least one of a transmission timing and the frequency channel which is not used for the base station 10 to transmit the reference signal as the radio resources which are used to transmit the sensor signal. Then, the control unit 250 notifies the modulation unit 214 of the selection result to transmit the sensor signal using the selected radio resources. Accordingly, it is possible to avoid the interference between the reference signal from the base station 10 and the sensor signal from the wireless node 20. In this way, information indicating the transmission power, the spread code length, and the radio resources decided to be used at the time of transmission of the sensor signal is also referred to as transmission setting below.

The control unit 250 may perform carrier sensing. Specifically, the control unit 250 may suppress the transmission of the sensor signal based on the measurement result of the reception level of the wireless signal output from the measurement unit 220.

(6) Storage Unit 260

The storage unit 260 stores various kinds of information to be used in the wireless node 20. For example, the storage unit 260 stores candidates of the fixed pattern which can be detected as the reference pattern, candidates of the usable radio resources, and candidates of the spread code which can be used in the modulation unit 214. The storage unit 260 (second storage unit) stores information indicating the pre-decided transmission power (standard transmission power) of the base station 10 and the reception level (target reception power) serving as the standard of the base station 10. The storage unit 260 may store candidates of the radio resources which can be used for the base station 10 to transmit the reference signal. The control unit 250 decides the transmission setting using various kinds of information stored in the storage unit 260. The storage unit 260 may store information indicating the decided transmission setting and the transmission setting may be reused by the control unit 250.

The example of the internal configuration of the wireless node 20 according to the embodiment has been described. Next, an operation process by the wireless communication system 1 according to the embodiment will be described with reference to FIGS. 6 to 8.

[2-3. Operation Process]

Figure 6:
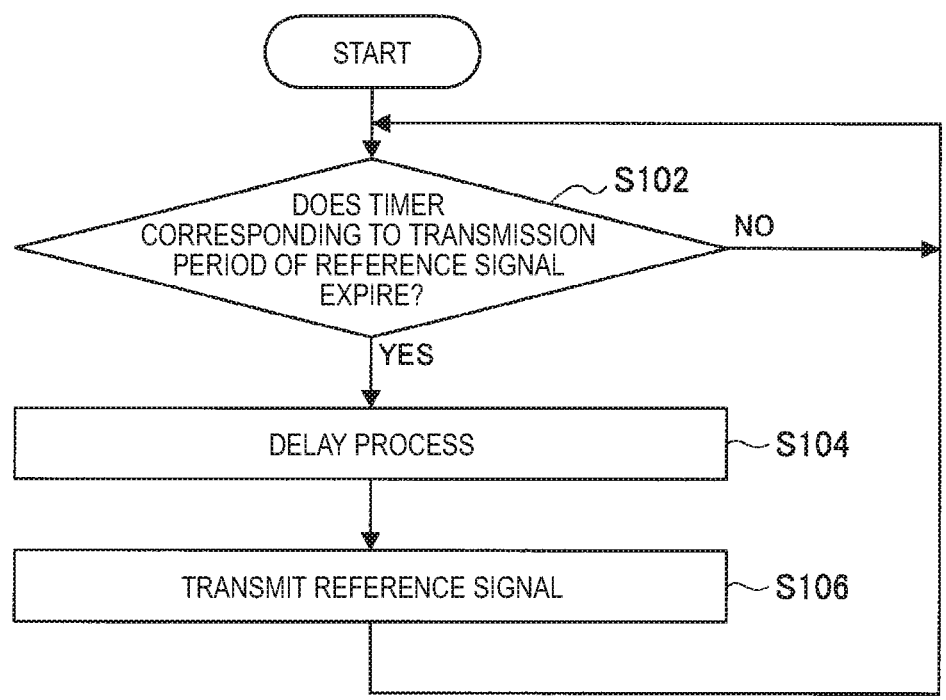
FIG. 6 is a flowchart showing an example of the flow of a reference signal transmission process performed in the base station according to the first embodiment.

FIG. 6 is a flowchart showing an example of the flow of a reference signal transmission process performed in the base station 10 according to the embodiment. As shown in FIG. 6, in step S102, the base station 10 first determines whether a timer corresponding to a transmission period of the reference signal expires. When the base station 10 determines that the timer does not expire (No in step S102), the process returns to step S102.

When the base station 10 determines that the timer expires (YES in S102), the base station 10 performs a delay process in step S104. Specifically, the reference signal transmission unit 116 delays a process by an appropriate offset time and transmits the reference signal. Accordingly, it is possible to avoid the interference with the reference signal transmitted from another base station 10. The details of the appropriate offset time will be described in detail below.

Subsequently, in step S106, the base station 10 transmits the reference signal. Specifically, the reference signal transmission unit 116 transmits the reference signal under the control of the control unit 140. In modulation of the reference signal, for example, simple FSK modulation is used. The transmission time of the reference signal and the radio resources to be used are set within a range of a radio law in a territory. Here, the wireless communication unit 110 can avoid the interference with the reference signal transmitted from another base station 10 by using the appropriate radio resources and reference pattern. The appropriate radio resources and reference pattern will be described in detail below.

Through such a process, the demodulation unit 114 repeatedly continue to transmit the reference signal. The example of the operation process by the base station 10 according to the embodiment has been described. Next, an example of an operation process by the wireless node 20 according to the embodiment will be described with reference to FIGS. 7 and 8.

Figure 7:
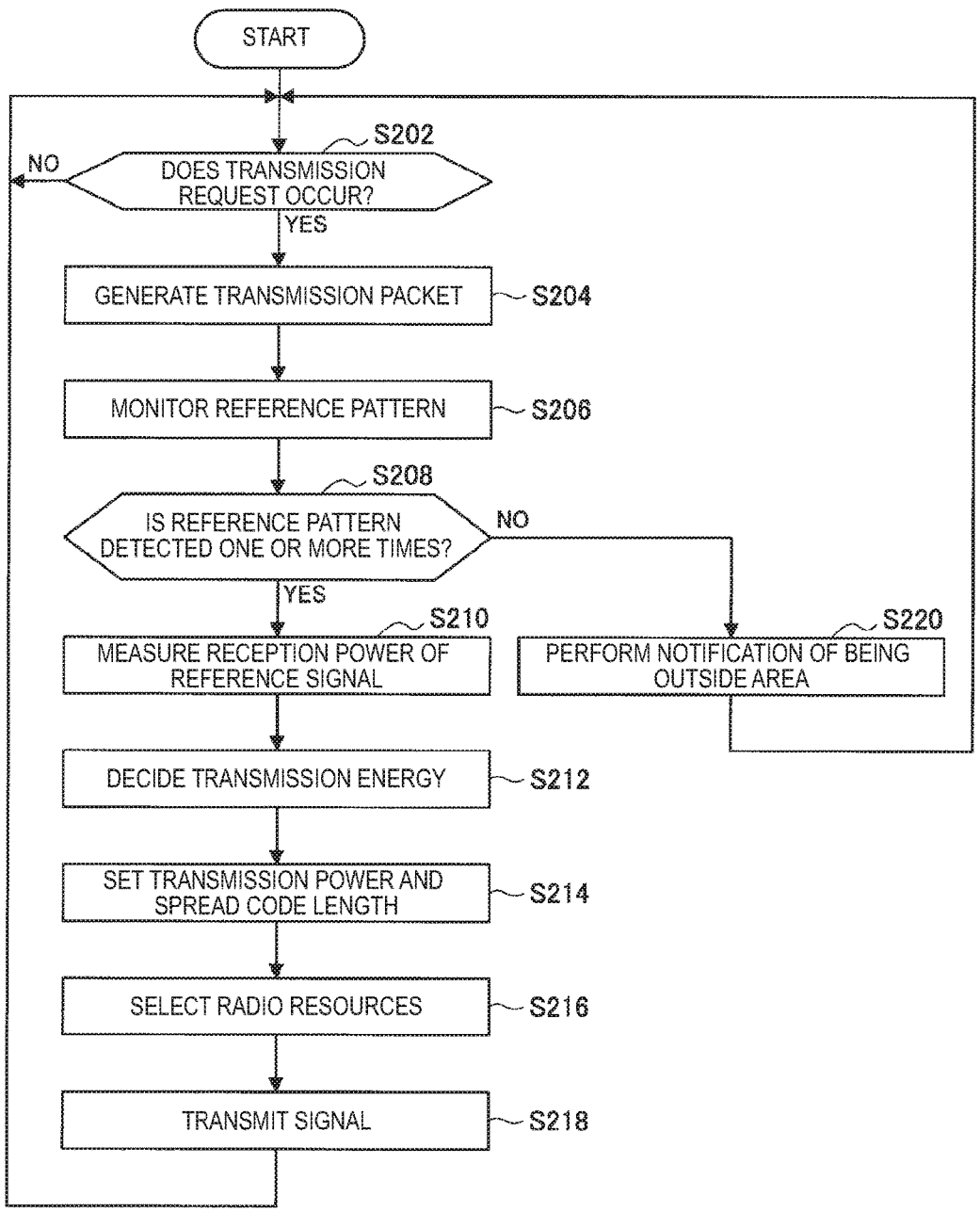
FIG. 7 is a flowchart showing an example of the flow of a sensor signal transmission process performed in the wireless node according to the first embodiment.

FIG. 7 is a flowchart showing an example of the flow of a sensor signal transmission process performed in the wireless node 20 according to the embodiment. As shown in FIG. 7, in step S202, the wireless node 20 first determines whether a transmission request occurs. For example, the control unit 250 determines that the transmission request occurs, for example, when the sensor unit 230 acquires the measurement data or the capacity of the acquired measurement data exceeds a threshold value. When the control unit 250 determines that no transmission request occurs (NO in S202), the process returns to step S202.

When the control unit 250 determines that the transmission request occurs (YES in S202), the wireless node 20 generates a transmission packet in step S204. Specifically, the data processing unit 240 generates the packets which has a fixed length and in which identification information of the base station 10 is added to the measurement data acquired by the sensor unit 230.

Subsequently, in step S206, the wireless node 20 monitors the reference pattern. Specifically, the control unit 250 first instructs the measurement unit 220 to start monitoring the reference pattern using the occurrence of the transmission request as a trigger. Accordingly, the measurement unit 220 starts monitoring the reference pattern. The measurement unit 220 monitors the signal input from the antenna for a predetermined time at the frequency channel which can be used for the base station 10 to transmit the reference signal. Then, the measurement unit 220 detect the reference pattern according to whether a correlation value with the fixed pattern usable as the reference pattern is greater than or equal to a certain threshold value.

Subsequently, in step S208, the wireless node 20 determines whether the reference pattern is detected one or more times. The storage unit 260 is assumed to store a transmission period of the reference signal by the base station 10. The measurement unit 220 monitors the reference pattern for a time longer than at least the transmission period and determines whether the reference pattern is successfully detected one or more times meanwhile.

When the detection of the reference pattern fails (NO in S208), the wireless node 20 notifies an owner or a maintenance person of the wireless communication system 1 in step S220 that the owner or the maintenance person is outside the area. In this case, the storage unit 260 may accumulate the measurement data to transmit the measurement data at the time of subsequent transmission. Then, the process returns to step S202.

When the reference pattern is successfully detected one or more times (YES in S208), the wireless node 20 measures the reception power of the reference signal in step S210. Specifically, the measurement unit 220 measures the reception intensity of the reference signal including the detected reference pattern and outputs the measurement result to the control unit 250.

Subsequently, in step S212, the wireless node 20 decides the transmission energy.

First, default transmission energy $E^N_{t0}$ in the wireless node 20 will be described. Each wireless node 20 stores information indicating the default transmission power (hereinafter referred to as $P^N_{t0}$) and default packet transmission time length (hereinafter referred to as $T^N_{t0}$) in advance in the storage unit 260. The default transmission time length $T^N_{t0}$ is a fixed value decided from a packet length of the transmission packet generated by the data processing unit 120, a modulation scheme of the modulation unit 214, an error correction code (ECC) rate, a use frequency bandwidth, and a default spread code length. These pieces of information are assumed to be common to all of the wireless nodes 20. The default transmission energy $E^N_{t0}$ in the wireless node 20 is expressed in the following equation.

[Math. 1]

$$E^N_{t0} = P^N_{t0} * T^N_{t0} \qquad \text{(Equation 1)}$$

Next, the decision of the transmission energy used for the wireless communication unit 210 to transmit the sensor signal and performed by the control unit 250 will be described with reference to FIG. 8.

Figure 8:
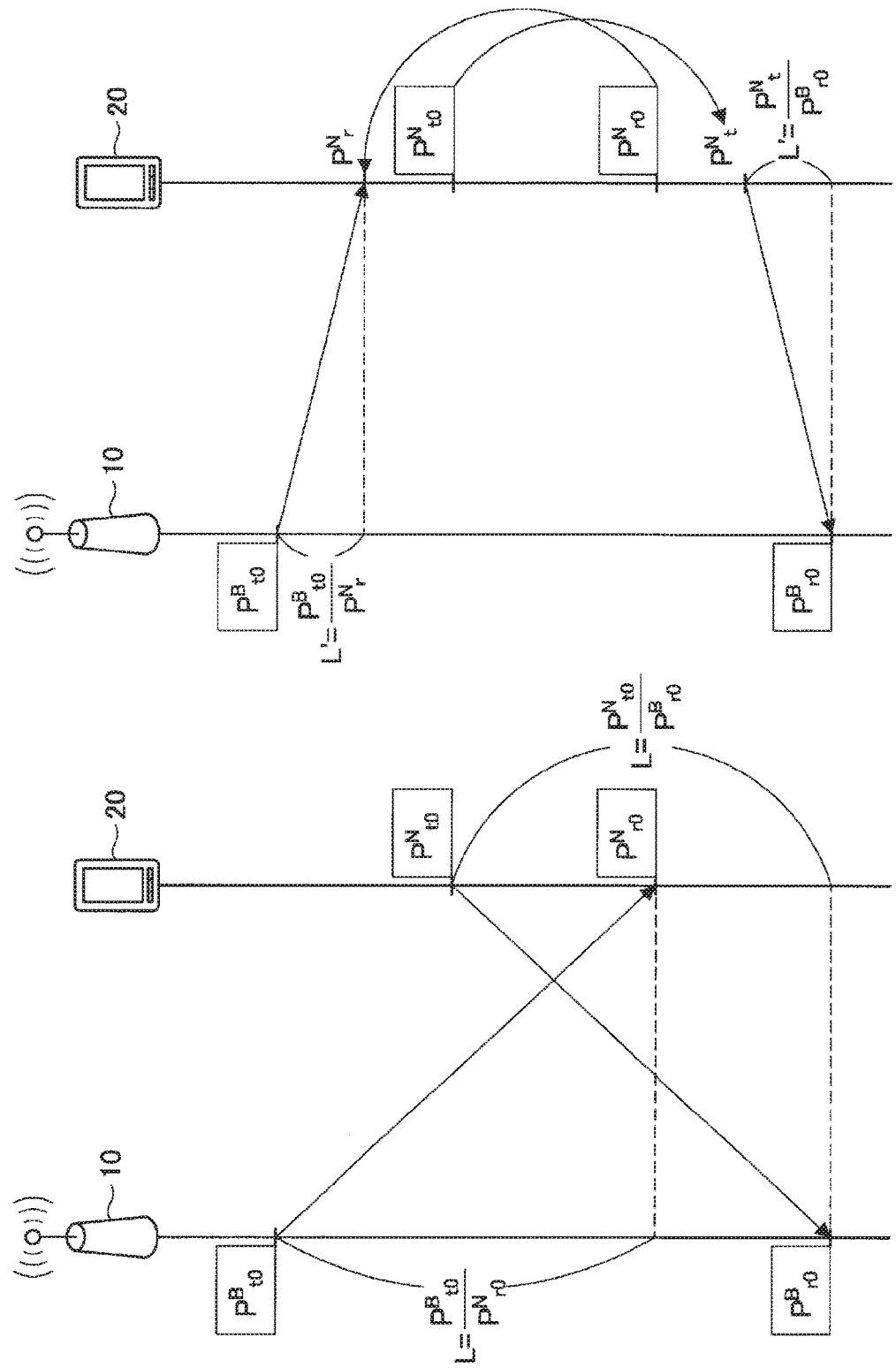
FIG. 8 is an explanatory diagram showing a transmission energy control process by the wireless node according to the first embodiment.

FIG. 8 is an explanatory diagram showing a transmission energy control process by the wireless node 20 according to the embodiment. In the left drawing of FIG. 8, a relation between the transmission power and the reception power of the base station 10 and the wireless node 20 in a model case is shown. As shown in the left drawing of FIG. 8, the reception power of the reference signal in the wireless node 20 when the base station 10 transmits the reference signal with a standard transmission power $P^B_{t0}$ is referred to as a standard reception power $P^N_{r0}$. In order for the reception power of the wireless signal in the base station 10 to become a target reception power $P^B_{r0}$, it is necessary for the wireless node 20 to transmit the wireless signal with the target transmission power $P^N_{t0}$. When an attenuation degree of radio waves between the base station 10 and the wireless node 20 is assumed to be constant, the following equation is established.

[Math. 2]

$$L = \frac{P^B_{t0}}{P^N_{r0}} = \frac{P^N_{t0}}{P^B_{r0}} \qquad \text{(Equation 2)}$$

In the foregoing equation 2, a gain by an antenna is omitted from the equation on the assumption that the gain by the antenna is the same in the transmission and reception of the base station 10 and the wireless node 20, but correction may be performed in accordance with an appropriate antenna gain.

The reception power of the reference signal measured by the measurement unit 220 is referred to as wireless node reception power $P^N_r$. In order to reflect a difference between the model case and an actual environment to the transmission energy, the control unit 250 decides transmission energy $E^N_t$ used to transmit the sensor signal as in the following equation.

[Math. 3]

$$E^N_t = E^N_{t0} * \frac{P^N_{r0}}{P^N_r} \qquad \text{(Equation 3)}$$

The decision of the transmission energy has been described above.

Here, the standard reception power $P^N_{r0}$ is decided as follows from the relation indicated by the foregoing equation 2 based on the target transmission power $P^N_{t0}$, the standard transmission power $P^B_{t0}$, and the target reception power $P^B_{r0}$. In the storage unit 260, the standard reception power $P^N_{r0}$, the target transmission power $P^N_{t0}$, the standard transmission power $P^B_{t0}$, and the target reception power $P^B_{r0}$ are preset.

[Math. 4]

$$P^N_{r0} = \frac{P^B_{t0} * P^B_{r0}}{P^N_{t0}} \quad \text{(Equation 4)}$$

In the right drawing of FIG. 8, a relation between the transmission power and the reception power of the base station 10 and the wireless node 20 in the actual environment is shown. As shown in the right drawing of FIG. 8, when the base station 10 transmits the reference signal with the standard transmission power $P^B_{t0}$, the reception power of the reference signal in the wireless node 20 becomes Pr because of a difference in a radio-wave environment between the model case and the actual environment. In order for the reception power of the sensor signal in the base station 10 to become the target reception power $P^B_{r0}$, it is necessary for the transmission power to be set to the transmission power $P^N_t$ in the wireless node 20 when the packet transmission time length is not changed. When an attenuation degree of radio waves between the base station 10 and the wireless node 20 is assumed to be constant, the following equation is established, as in the left drawing of FIG. 8.

[Math. 5]

$$L' = \frac{P^B_{t0}}{P_r} = \frac{P^N_t}{P^B_{r0}} \quad \text{(Equation 5)}$$

Subsequently, in step S214, the wireless node 20 sets the transmission power and the spread code length. As indicated in the foregoing equation 1, the transmission energy $E^N_t$ is adjusted to adjust the transmission power or adjust the packet transmission time length. Accordingly, the control unit 250 freely decides the transmission power $P^N_t$ and the packet transmission time $T^N_t$ in a range in which a relation between the following parameters α and β is satisfied.

[Math. 6]

$$P^N_t = \alpha P^N_{t0} \quad \text{(Equation 6)}$$

[Math. 7]

$$T^N_t = \beta T^N_{t0} \quad \text{(Equation 7)}$$

[Math. 8]

$$\alpha\beta = \frac{P^N_{r0}}{P^N_r} \quad \text{(Equation 8)}$$

The control unit 250 can decide the foregoing parameters α and β as any values. Then, the control unit 250 decides the spread code length used in the modulation unit 214 based on the value of the parameter β and the default spread code length. Focusing on description of the control of the transmission power $P^N_t$ in the present specification, the parameters α and β are defined in the following equation. In this way, the control unit 250 sets the transmission power $P^N_t$ and the spread code length.

[Math. 9]

$$\alpha = \frac{P^N_{r0}}{P^N_r}, \beta = 1 \quad \text{(Equation 9)}$$

Subsequently, in step S216, the wireless node 20 selects the radio resources used to transmit the sensor signal. Specifically, the control unit 250 selects the radio resources which are not used for the base station 10 to transmit the reference signal. The control unit 250 notifies the modulation unit 214 of the transmission setting formed by information indicating the transmission power to be used to transmit the sensor signal, the spread code length, and the radio resources decided in the foregoing sequence and triggers the transmission of a packet.

In step S218, the wireless node 20 transmits the sensor signal in which the measurement data is stored based on the transmission setting notified of by the control unit 250. Specifically, the modulation unit 214 first performs a data modulation process and an encoding process on a transmission packet output from the data processing unit 240. Next, the modulation unit 214 selects the spread code based on the spread code length indicated by the transmission setting and performs direct spreading. A series of spread codes to be used is different for each wireless node 20 and each mutual correlation is preferably small. Subsequently, the modulation unit 214 amplifies power so that the notified transmission power is satisfied by multiplying a carrier frequency of a frequency channel of the radio resources indicated by the transmission setting. Then, the modulation unit 214 transmits the sensor signal from a transmission antenna to the base station 10 at a transmission time indicated by the radio resources indicated by the transmission setting.

The example of the operation process by the wireless node 20 according to the embodiment has been described above.

The sensor signal transmission process described above with reference to FIGS. 7 and 8 can be performed asynchronously in the plurality of wireless nodes 20. On the other hand, the base station 10 normally wait to receive the sensor signals from the wireless nodes 20 while repeatedly transmitting the reference signals. The demodulation unit 114 of the base station 10 is assumed to be able to receive the plurality of frequency channels in parallel and to perform the despreading process simultaneously using the plurality of spread codes.

Next, interference of the sensor signals in the base station 10 will be described assuming an example in which the radio resources (the transmission times and the frequency channels) used for the wireless nodes 20A and 20B shown in FIG. 1 to transmit the sensor signals are the same. When there is a situation such as a long distance between the wireless nodes 20A and 20B or presence of an obstacle, the carrier sensing may not work and interference may occur. In the base station 10A, the signals from the wireless nodes 20A and 20B having a positional relation in which propagation attenuation is mutually different interfere with each other and are received, but the reception power levels are the same because of the above-described control of the transmission energy. Therefore, the base station 10A can separate both of the sensor signals by performing the despreading using the spread code used in the wireless nodes 20 and acquire the measurement data. Thereafter, the base station 10A transmits the measurement data to the management server 30 via the backbone communication path 40. The wireless nodes 20 which have finished the transmission of the sensor signals can pause the transmission of the sensor signals and the detection of the reference patterns to reduce power consumption until a subsequent transmission request occurs.

The wireless node 20 and the base station 10 perform the above-described processes, and thus the wireless node 20 can resolve the perspective problem without transmitting and receiving the messages for controlling the transmission power to and from the base station 10 and can also realize an improvement in the capacity of the system through code multiplexing. The capacity of the system refers to the capacity of measurement data which can be transmitted and received in the wireless communication system 1 per unit time. The wireless node 20 may not include a mechanism transmitting and receiving a control message for controlling the transmission energy, and thus the power consumption for transmitting and receiving the control message can be reduced. Further, the wireless node 20 can transmit the sensor signal with minimum transmission energy to resolve the perspective problem through the control of the transmission energy, and thus the power consumption can be reduced.

[2-4. Radio Resource Selection Methods]

Next, radio resource selection methods by the wireless communication system 1 will be described. As in the example shown in FIG. 1, the reference signals from the plurality of base stations 10 can interfere with each other in the wireless nodes 20 in an environment in which there are the plurality of base stations 10 in the cells 11 overlapping. In this case, it is difficult for the wireless node 20 to correctly measure the reception power of the reference signal. Therefore, it is necessary for the base station 10 to select the radio resources which may not interfere with each other. It is necessary for the wireless node 20 to avoid the interference with the reference signal by using the radio resources which are not used by the base station 10. Various radio resource selection methods by which the base station 10 and the wireless node 20 efficiently use the radio resources while avoiding such interference are considered.

For example, first to fourth radio resource selection methods will be described below with reference to FIGS. 9 to 12. In the drawings, an example of the radio resources (the frequency channels and the transmission times) which can be used by the base stations 10A, 10B, and 10C and one or more wireless nodes 20 is shown. For example, it is assumed that 5 frequency channels are usable and time flows from the left to the right. Of course, any numbers of base stations 10 and wireless nodes 20 and any channel number and bandwidth of frequency channels can be used. The plurality of base stations 10 are assumed to perform time synchronization with each other via the backbone communication path 40. The base stations 10 share transmission time slots (time start times and a transmission lengths) that transmit the reference signals with the other base stations 10, and the transmission start times are mutually shifted. Accordingly, the interference of the mutual reference signals are avoided. A shift width of the transmission time corresponds to an offset time at which the delay process performed in step S104 of FIG. 7 is performed.

(First Selection Method)

Figure 9:
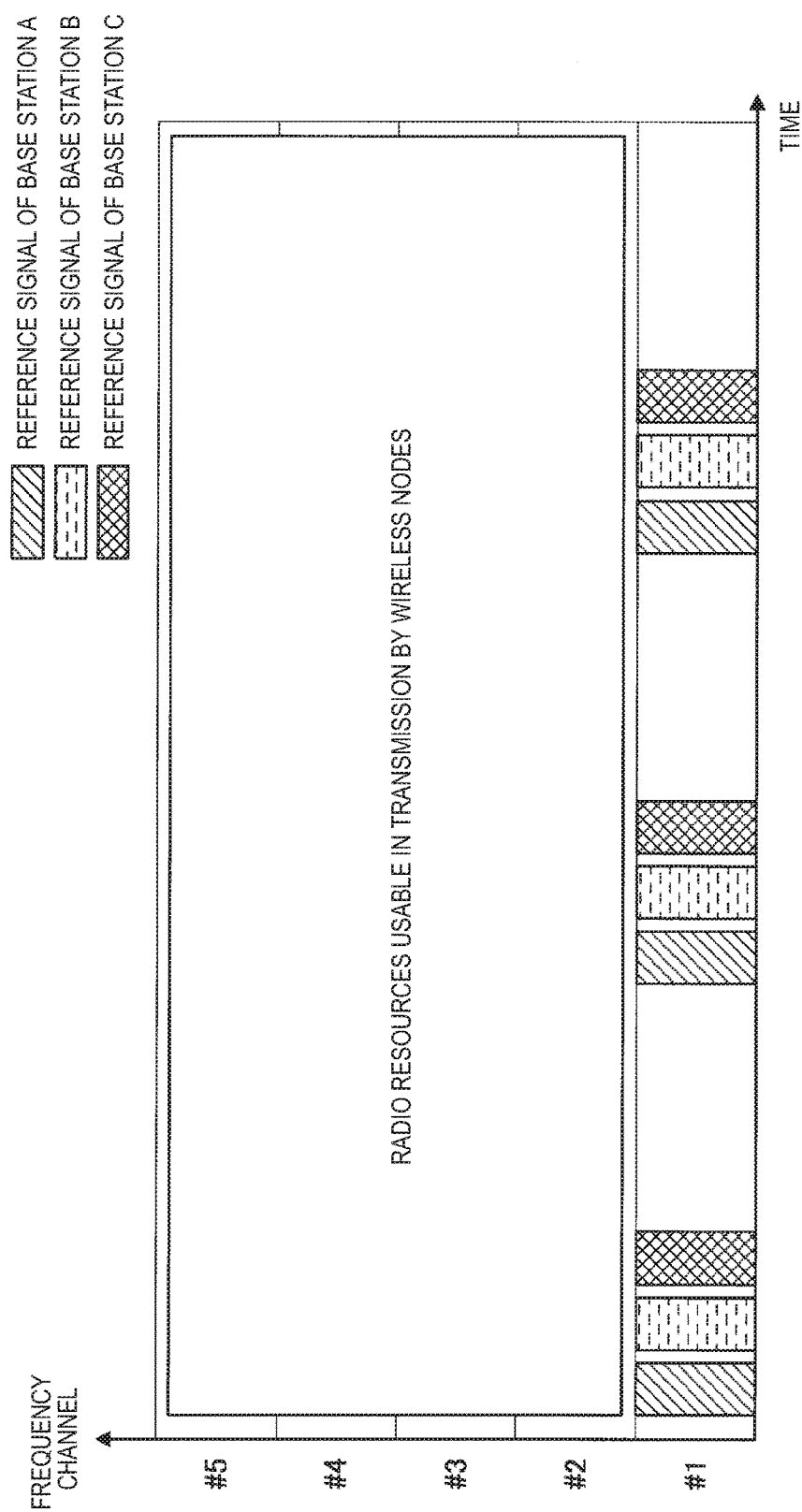
FIG. 9 is an explanatory diagram showing a first selection method for the radio resources by a wireless communication system according to the first embodiment.

FIG. 9 is an explanatory diagram showing the first selection method for the radio resources by the wireless communication system 1 according to the embodiment. As described in FIG. 9, in the present selection method, the frequency channels to be used between the plurality of base stations 10 are set to be the same and the transmission time slot to be used is divided. The wireless node 20 uses all of the transmission time slots of the different frequency channel from the frequency channels used by the base stations 10. In a situation in which the cells 11 do not overlap and the interference of the reference signals does not occur, the same transmission time slot may be reused between the plurality of base stations 10. That is, the base stations 10 in which the cells 11 overlap use at least the mutually different transmission time slots. Only when the reference patterns are detected, the wireless node 20 monitors frequency channel #1 which is the transmission frequency of the reference signal and uses one of the other frequency channels for transmission by the wireless node 20. The base stations 10 monitor frequency channels #2 to #5 and wait for the sensor signal from the wireless node 20.

Here, for example, as in the wireless node 20C shown in FIG. 1, the wireless node 20 can receive the signals transmitted from the plurality of base stations 10 when the wireless node 20 is located in the overlapping portion of the plurality of cells 11. Accordingly, the measurement unit 220 of the wireless node 20 can receive the reference signal using the different transmission time slot for each base station 10 and can detect the reference patterns. However, when the reference patterns used between the plurality of base stations 10 overlap despite a difference in the transmission time slot between the plurality of base stations 10, it may be difficult to distinguish from which wireless node 20 the received reference signal is transmitted in some cases. In these cases, the base station 10 decides the transmission energy to be used at the time of transmission of the sensor signal based on the highest reception power among the reception powers measured from the plurality of reference signals. That is, the control unit 250 decides the transmission energy based on the reference signal from the base station 10 located at a shortest distance from the wireless node 20. Accordingly, the base station 10 closest to the wireless node 20 can successfully receive the sensor signal. Another base station 10 can also successfully receive the sensor signal. However, in this case, the management server 30 detects and discards overlapping of the measurement data. When the transmission time slot used by each base station 10 is known on the side of the wireless node 20, the wireless node 20 may identify from which the wireless node 20 the received reference signal has been transmitted in accordance with a reception time of the reference signal.

According to the present selection method, even in an environment in which there are the plurality of base stations 10 (multi-cell environment), it is possible to improve the capacity of the system through code multiplexing and reduce power consumption of the wireless node 20.

(Second Selection Method)

Figure 10:
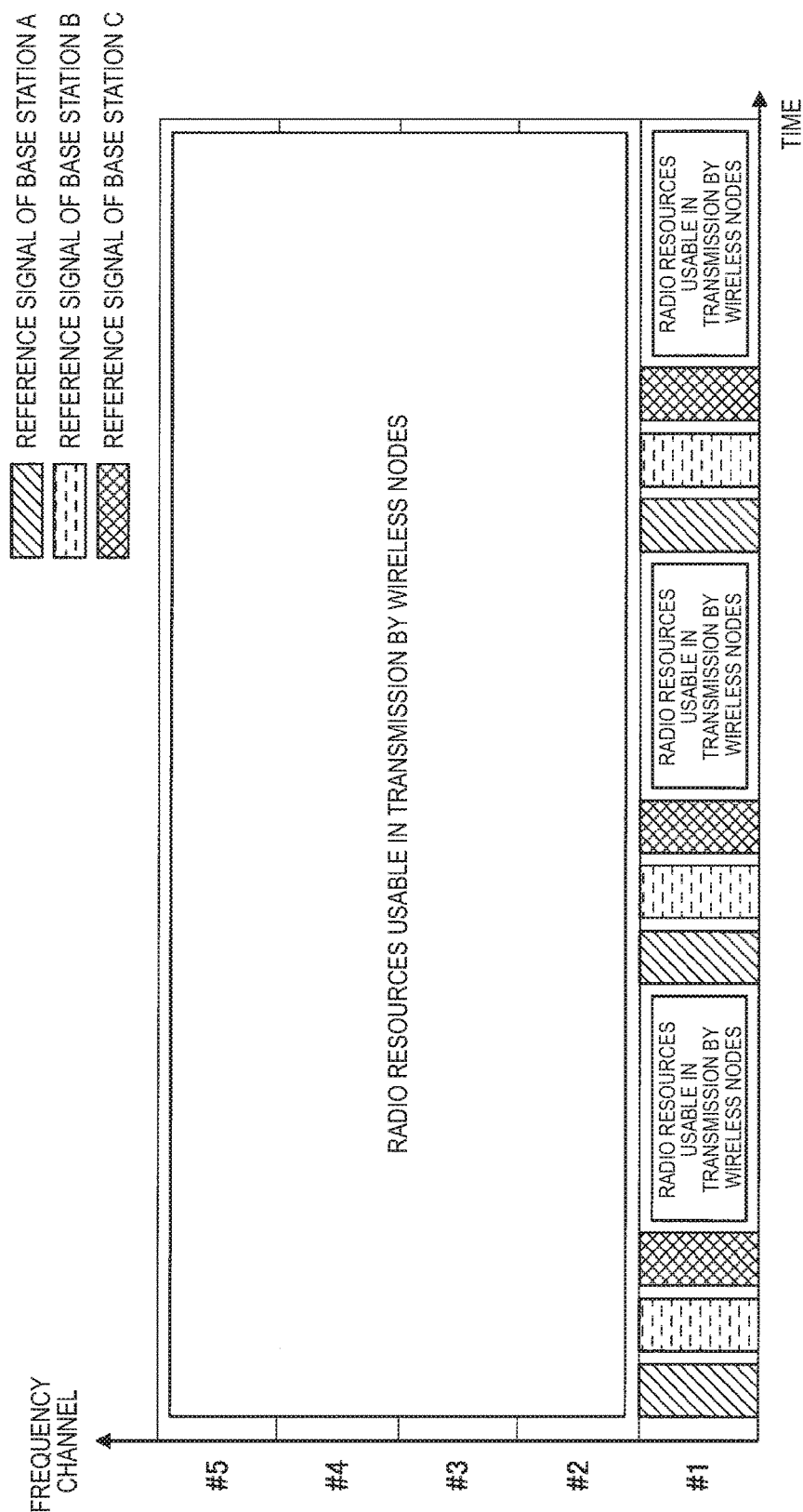
FIG. 10 is an explanatory diagram showing a second selection method for the radio resources by a wireless communication system according to the first embodiment.

FIG. 10 is an explanatory diagram showing the second selection method for the radio resources by the wireless communication system 1 according to the embodiment. As shown in FIG. 10, in the present selection method, the frequency channels to be used are set to be the same between the plurality of base station 10 and the transmission time slot (the transmission start time and the transmission length) to be used is divided. The wireless node 20 uses all of the transmission time slots of the different frequency channel from the frequency channels used by the base stations 10 and uses the different transmission time slot from the transmission time slot used by the base station 10 in the same frequency channel as the frequency channel used by the base station 10. In the example shown in FIG. 10, the wireless node 20 can use the transmission time slot which is frequency channel #1 and is not used to transmit the reference signal in addition to the first selection method.

Each wireless node 20 is assumed to acquire a time synchronized with a time on the side of the base station 10. For example, the wireless node 20 may acquire absolute time information by GPS included in the sensor unit 230 and the base station 10 may also acquire the absolute time information by GPS. The storage unit 260 of each wireless node 20 is assumed to store not only the transmission period of the reference signal in the base station 10 but also the positions of all the transmission time slots which can be used by the base station 10 in the wireless communication system 1 within the period. When the reference signal is received, the wireless node 20 may store a start position of the transmission period of the reference signal.

The wireless node 20 detects the reference patterns based on the stored information, and subsequently transmits the sensor signal using the frequency channel used to transmit the reference signal and the transmission time slot not used to transmit the reference signal. In the present selection method, the base station 10 monitors the frequency channel used to transmit the reference signal at the transmission time slot not used by the base station 10 and the other base stations 10 and waits for the sensor signal from the wireless node 20.

According to the present selection method, it is possible to use the radio resources more efficiently than the first selection method by increasing the radio resources which can be used by the wireless node 20. An increase in the capacity of the system is realized with an increase in the radio resources which can be used by the wireless node 20.

(Third Selection Method)

Figure 11:
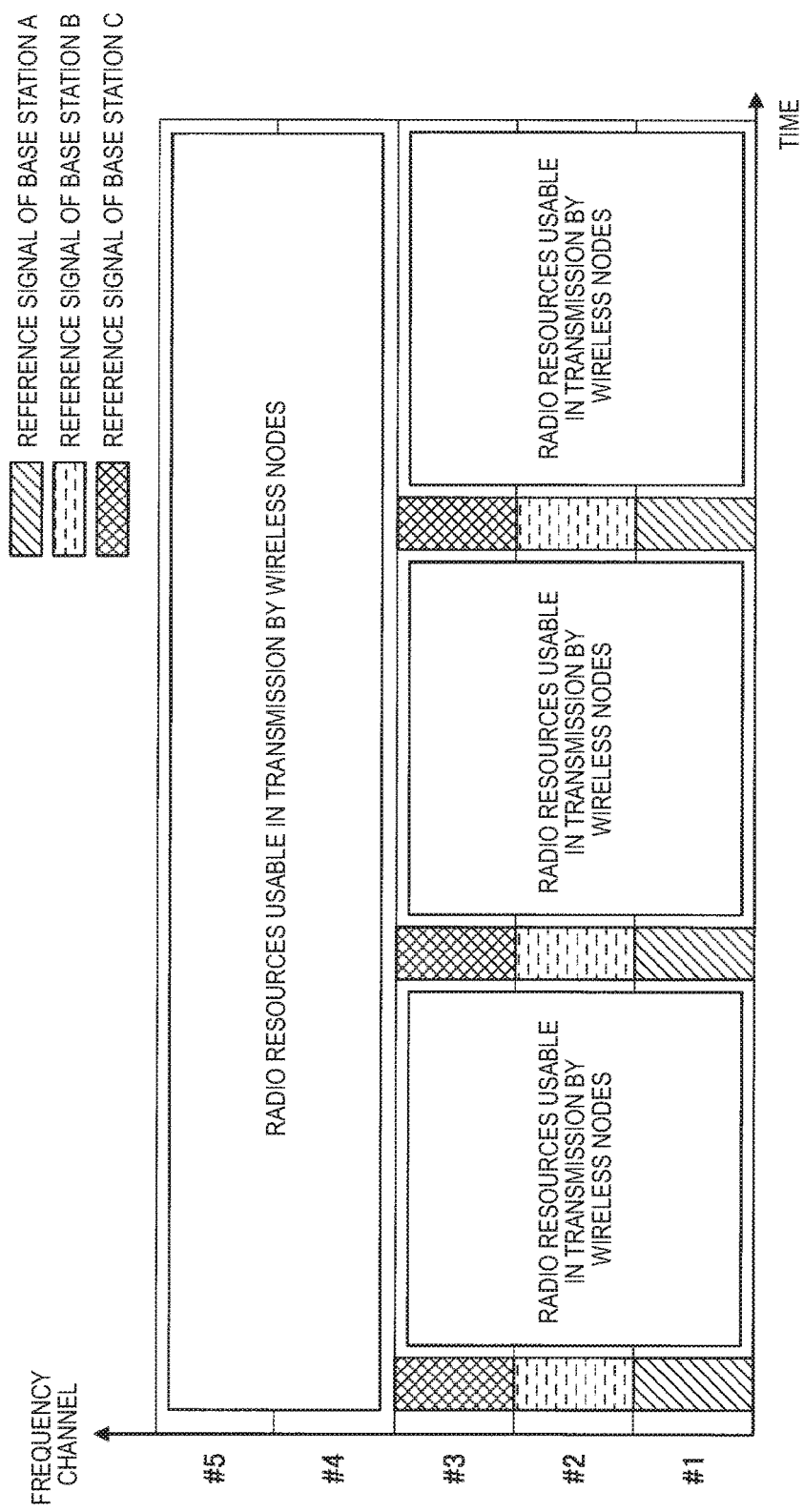
FIG. 11 is an explanatory diagram showing a third selection method for the radio resources by a wireless communication system according to the first embodiment.

FIG. 11 is an explanatory diagram showing the third selection method for the radio resources by the wireless communication system 1 according to the embodiment. As shown in FIG. 11, in the present selection method, the transmission time slots to be used are set to be same and the frequency channels to be used are set to be different between the plurality of base stations 10. The wireless node 20 uses all of the transmission time slots of the different frequency channel from the frequency channel used by the base station 10 and uses the different transmission time slot from the transmission time slot used by the base station 10 at the same frequency channel as the frequency channel used by the base station 10. In the present selection method, the delay process corresponding to the offset time may not be performed in the base station 10. In a situation in which the cells 11 do not overlap and no interference of the reference signals occur, the same frequency channel may be reused between the plurality of base stations 10. That is, the base stations 10 in which the cells 11 overlap use at least the different frequency channels.

In the present selection method, the measurement unit 220 of the wireless node 20 receives the reference signal using the frequency channel different for each base station 10 and detects the reference patterns. The measurement unit 220 is assumed to be able to monitor the plurality of frequency channels simultaneously or in parallel. In the above-described first and second selection methods, time-division multiplexing is performed on the same frequency channel in the transmission of the reference signal. Therefore, when the reference signals from the plurality of base stations 10 are assumed to be received, it is necessary for the wireless node 20 to monitor the reference patterns at least at all of the usable transmission time slots. In contrast, in the present selection method, as shown in FIG. 11, frequency-division multiplexing is performed at the same transmission time slot in the transmission of the reference signal. Therefore, when the reference patterns are detected once, it is not necessary for the wireless node 20 to monitor the reference patterns at a subsequent transmission time slot.

According to the present selection method, it is possible to shorten the monitoring time of the reference patterns in the wireless node 20 more than in the above-described first and second selection methods, and thus it is possible to reduce the power consumption of the wireless node 20.

(Fourth Selection Method)

Figure 12:
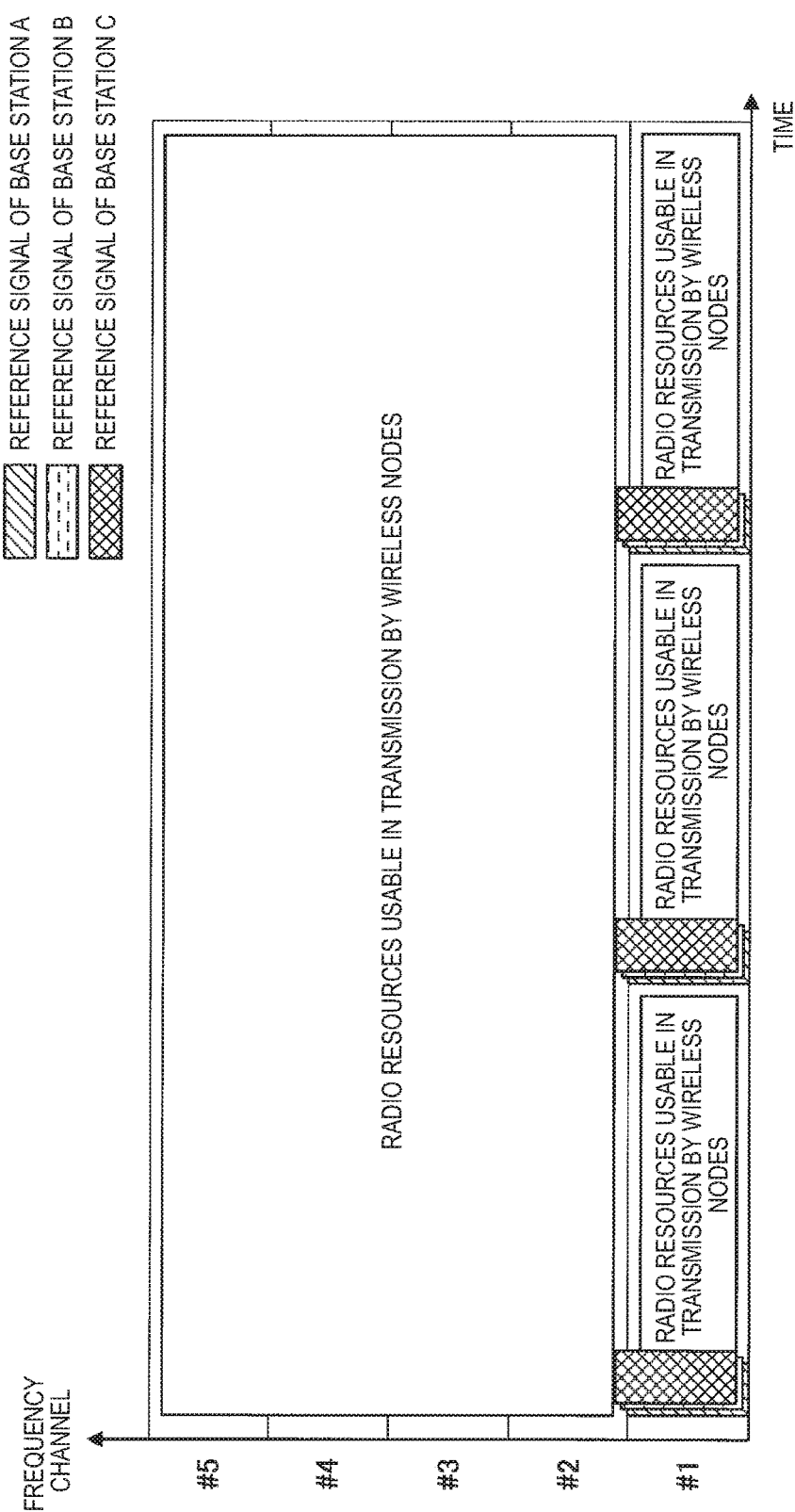
FIG. 12 is an explanatory diagram showing a fourth selection method for the radio resources by a wireless communication system according to the first embodiment.

FIG. 12 is an explanatory diagram showing the fourth selection method for the radio resources by the wireless communication system 1 according to the embodiment. As shown in FIG. 12, in the present selection method, the frequency channels and the transmission time slots to be used are set to be same and the reference patterns to be transmitted are set to be different between the plurality of base stations 10. The reference signal preferably has sufficient small mutual correlation characteristics with the other reference signals. The allowable mutual correlation characteristics have a size which is a value by which each reference signal can be regarded as a pseudo-random pattern and are the same mutual correlation characteristics as an M series or a Gold series. The wireless node 20 uses all of the transmission time slots of the different frequency channel from the frequency channel used by the base station 10 and uses the different transmission time slot from the transmission time slot used by the base station 10 at the same frequency channel as the frequency channel used by the base station 10. In a situation in which the cells 11 do not overlap and no interference of the reference signals occur, the same reference patterns may be reused between the plurality of base stations 10. That is, the base stations 10 in which the cells 11 overlap use at least the different reference patterns. In the present selection method, the delay process corresponding to the offset time may be not performed in the base station 10. The frequency channel and the transmission time slot used by the base station 10 are assumed to be known in all of the wireless nodes 20.

In the present selection method, the measurement unit 220 of the wireless node 20 detects the reference patterns which are different for each the base station 10 and have the sufficiently small mutual correlation characteristics. The measurement unit 220 is assumed to be able to perform correlation detection of the plurality of reference patterns simultaneously or in parallel. In the present selection method, code-division multiplexing is performed on the same transmission time slot and the same frequency channel in the transmission of the reference signal from each base station 10. Therefore, even when the plurality of kinds of reference signals are assumed to be received from the plurality of base stations 10, it is not necessary for the wireless node 20 to monitor the reference patterns at the subsequent transmission time slot when the reference pattern is detected once. Here, according to the present selection method, unlike the other selection methods, noise can be mixed with a measurement value of the reception power by the measurement unit 220 depending on the mutual correlation characteristics of each reference pattern. Therefore, it is preferable to use the reference patterns which have the small mutual correlation.

According to the present selection method, as in the third selection method, it is possible to shorten the monitoring time of the reference patterns in the wireless node 20, and thus it is possible to reduce the power consumption of the wireless node 20. According to the present selection method, the radio resources which can be used by the wireless node 20 increase more than the other selection methods. Therefore, the radio resources are used more efficiently and an increase in the capacity of the system is realized.

The radio resource selection methods have been described above.

<3. Second Embodiment>

The present embodiment is a form in which a measurement value of the reception power and positional information are stored at the time of detection of reference patterns and detection of the reference patterns is omitted and the stored measurement values are used when a change in the position of the wireless node 20 is small. Examples of the configurations of the base station 10 and the wireless node 20 according to the embodiment have been described in the first embodiment, and thus the detailed description will be omitted herein. Hereinafter, an operation process by the wireless node 20 according to the embodiment will be described with reference to FIG. 13.

Figure 13:
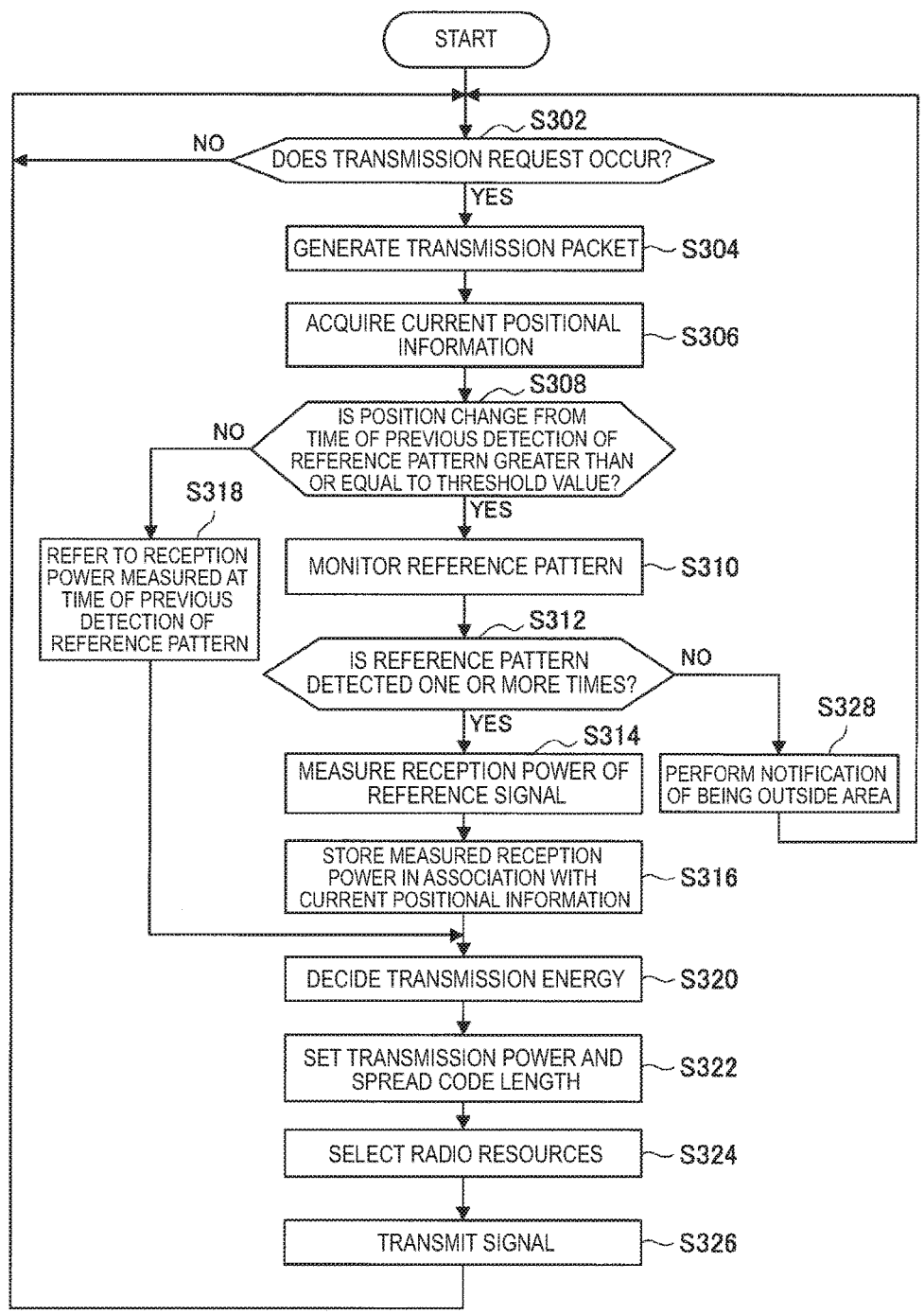
FIG. 13 is a flowchart showing an example of the flow of a sensor signal transmission process performed in a wireless node according to a second embodiment.

FIG. 13 is an explanatory diagram showing an example of a sensor signal transmission process performed by the wireless node 20 according to the embodiment. Referring to FIG. 13, steps S306, S308, S316, and S318 are added to the processes according to the first embodiment shown in FIG. 7. Accordingly, hereinafter, process of these steps will be focused on in the description and the processes of the repeated steps will be omitted.

As shown in FIG. 13, after the transmission packet is generated in step S304 using occurrence of a transmission request in step S302 as a trigger, the wireless node 20 acquires the current positional information in step S306. For example, the sensor unit 230 can function as a positional information acquisition unit that acquires the positional information of the wireless node 20 by a positioning sensor.

Subsequently, in step S308, the wireless node 20 determines whether a position change from the time of previous detection of the reference pattern is greater than or equal to a threshold value. For example, the control unit 250 compares the current positional information acquired in the foregoing step S306 to the positional information at the time of previous detection stored in the storage unit 260 to determine whether a distance difference is greater than or equal to the threshold value.

When the wireless node 20 determines that the position change is greater than or equal to the threshold value (YES in S308), the reception power of the reference signal is measured in steps S310 to S314. Then, in step s316, the wireless node 20 stores the measured reception power in association with the current positional information. For example, the storage unit 260 can function as a first storage unit that stores the reception power measured by the measurement unit 220 in association with the positional information acquired at the time of the measurement (the foregoing step S306) by the sensor unit 230. When the storage unit 260 has already stored a combination of the reception power and the positional information, the storage unit 260 may update the reception power and the positional information or may additionally store the reception power and the positional information. In FIG. 13, the example in which the reference pattern is monitored after the acquisition of the positional information has been described. This order may be reversed or the acquisition of the positional information and the monitoring of the reference pattern may be simultaneously performed in parallel. Thereafter, in step S320, the transmission energy is decided based on the reception power measured in the foregoing step S314.

Conversely, when the wireless node 20 determines that the position change is less than the threshold value (NO in S308), the monitoring of the reference pattern and the measurement of the reception power of the reference signal are omitted. Specifically, in step S308, the wireless node 20 refers to the reception power measured at the time of previous detection of the reference pattern. For example, the control unit 250 reads the recently stored reception power from the storage unit 260. Then, in step S320, the control unit 250 decides the transmission energy based on the reception power referred to by the storage unit 260.

Thereafter, the wireless node 20 sets the transmission power and the spread code length in step S322, selects the radio resources in step S324, and transmits the sensor signal based on such transmission setting in step S326.

The operation process by the wireless node 20 according to the embodiment has been described above. According to the embodiment, in the wireless node 20 in which mobility is small, it is possible to reduce power consumption by omitting the measurement of the reception power of the reference signal. When mobility is small, it is not necessary for the wireless node 20 to wait for detection of the reference pattern after a transmission request occurs. Therefore, it is possible to reduce a time lag from the occurrence of the transmission request to the transmission of the sensor signal.

In the example shown in FIG. 13, when the position change from the time of previous detection of the reference pattern is less than the threshold value, the transmission energy is controlled with reference to the previously measured reception power value, as described above. The technology according to the present disclosure is not limited thereto. For example, the wireless node 20 may additionally store combinations of the reception power and the positional information at the time of detection of the reference pattern and may control the transmission energy with reference to the reception power measured at a position close to the current position among the stored reception power.

In the embodiment, the base station 10 and the wireless node 20 can adopt any of the first to fourth selection methods for the radio resources.

<4. Third Embodiment>

The present embodiment is a form in which microcells and a macrocell are overlaid. First, an overview of a wireless communication system 1 according to the embodiment will be described with reference to FIG. 14.

Figure 14:
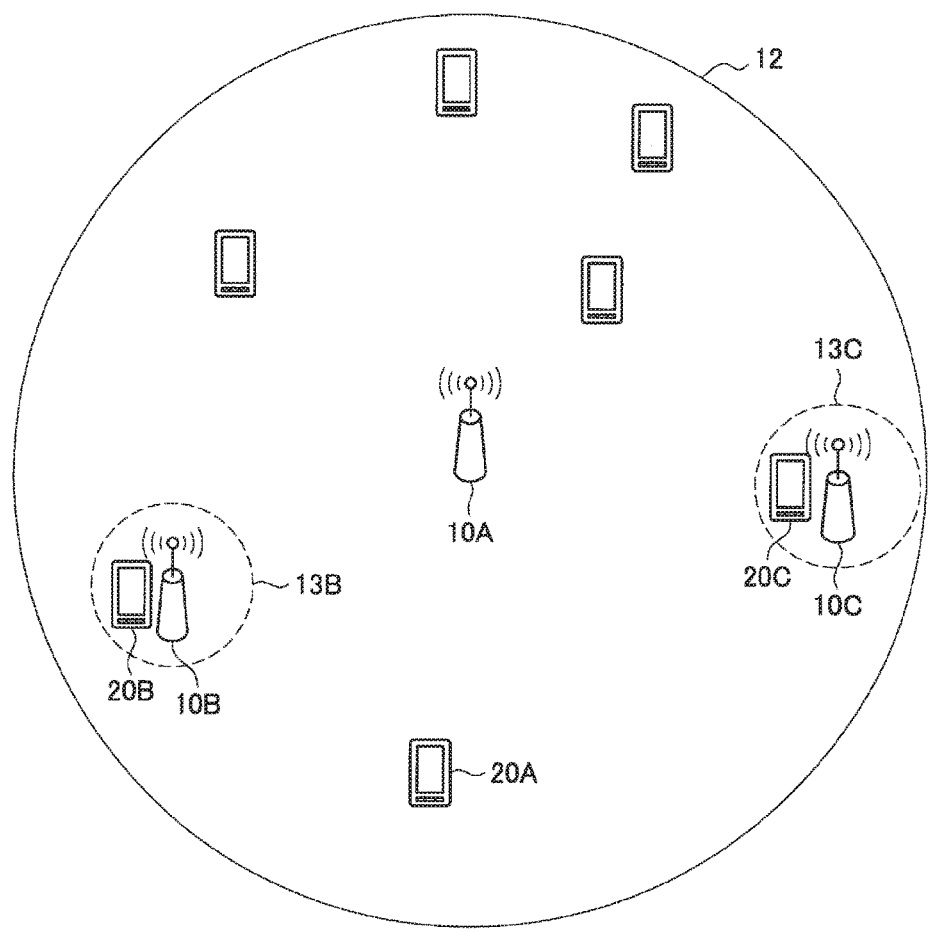
FIG. 14 is an explanatory diagram showing an overview of the wireless communication system according to a third embodiment.

FIG. 14 is an explanatory diagram showing an overview of the wireless communication system 1 according to the embodiment. As shown in FIG. 14, the wireless communication system 1 includes a plurality of base stations 10 and a plurality of wireless nodes 20. In the example shown in FIG. 14, a base station 10A is a macrocell base station that administrates a macrocell 12 and provides wireless communication services to one or more terminal devices located in the macrocell 12. Base stations 10B and 10C are microcell base stations that administrate microcells 13B and 13C, respectively, and provide wireless communication services to one or more terminal devices located in the microcells 13B and 13C. The microcell base station can be realized by, for example, a household small base station and may also be realized by a mobile device such as a smartphone on which hardware or software capable of operating as a microcell base station is mounted. The macrocell base station 10A and the microcell base stations 10B and 10C are connected to each other by the backbone communication path 40, as shown in FIG. 2.

Examples of the configurations of the base station 10 and the wireless node 20 according to the embodiment have been described in the first embodiment, and thus the detailed description thereof will be omitted herein. In the embodiment, however, the measurement unit 220 of the wireless node 20 may have a simple configuration in which at least one of a low noise amplifier (LNA) and an automatic gain control (AGC) circuit is not contained. When the measurement unit 220 does not include at least one of the LNA and the AGC, a distance in which the base station 10 is capable of detecting the reference pattern is shortened more than when both of the LAN and the AGC are included. On the other hand, a process in the measurement unit 220 is considerably simplified, and thus power consumption used to receive the reference signal is considerably reduced.

In the embodiment, the wireless node 20 prefers the microcell base station 10 as a sensor signal transmission destination. For example, when the wireless node 20 successfully receives the reference signal from the microcell base station, the wireless node 20 performs transmission energy control setting the microcell base station as a target. In the example shown in FIG. 14, the wireless node 20B located in the microcell 13B performs the transmission energy control setting the microcell base station 10B as a target and transmits the sensor signal. Conversely, when the wireless node 20 fails to receive the reference signal from the microcell base station, the wireless node 20 performs transmission energy control setting the macrocell base station as a target. In the example shown in FIG. 14, the wireless node 20A not located in the microcell performs the transmission energy control setting the macrocell base station 10A as a target and transmits the sensor signal. The wireless nodes 20 are assumed to transmit the sensor signals on different frequency channels toward the macrocell base station and the microcell base station. Each base station 10 is assumed to be able to receive the sensor signals on a plurality of frequency channels in parallel.

The overview of the wireless communication system 1 according to the embodiment has been described above. Next, an operation process of the wireless communication system 1 according to the embodiment will be described with reference to FIG. 15.

Figure 15:
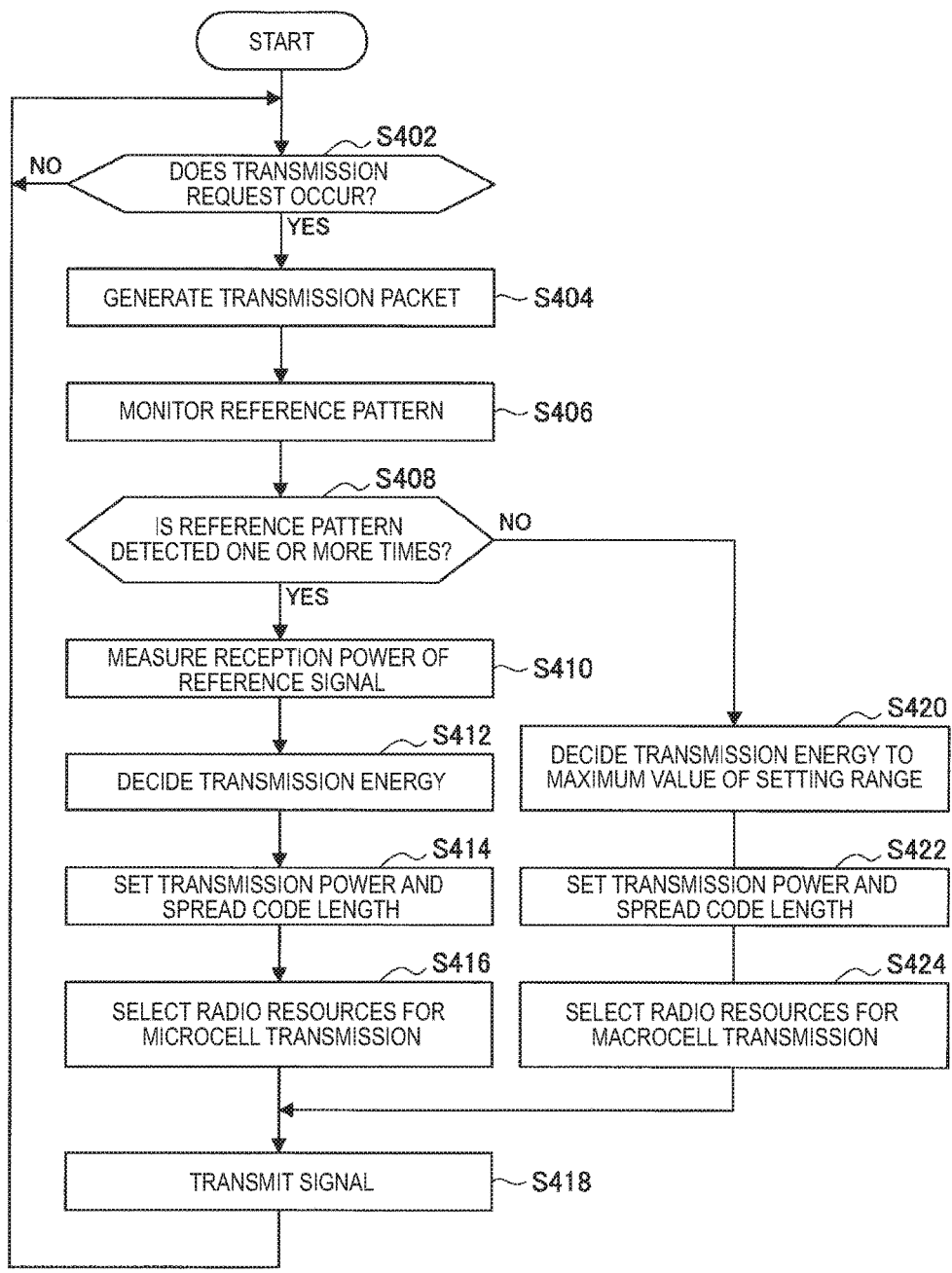
FIG. 15 is a flowchart showing an example of the flow of a sensor signal transmission process performed in a wireless node according to the third embodiment.

FIG. 15 is a flowchart showing an example of the flow of a sensor signal transmission process performed in the wireless node 20 according to the embodiment. In FIG. 15, only the microcell base station is assumed to transmit the reference signal and the macrocell base station is assumed not to transmit the reference signal. Referring to FIG. 15, steps S420, S422, and S424 are added to the processes when the detection of the reference pattern fails in place of the process (step S220 of FIG. 7) of notifying that the owner or the maintenance person is outside the area in the process related to the first embodiment illustrated in FIG. 7. Accordingly, hereinafter, the processes of these steps will be focused on in the description.

As shown in FIG. 15, the wireless node 20 generates the transmission packet in step S404 using occurrence of a transmission request in step S402 as a trigger, and monitors the reference pattern in step S406.

When the wireless node 20 successfully detects the reference pattern one or more times (YES in step S408), the wireless node 20 performs the energy control based on the reception power of the reference signal and transmits the sensor signal in steps S410 to S418. In the drawing, an example in which only the microcell base station transmits the reference signal is assumed. Accordingly, the wireless node 20 selects the frequency channel for the microcell base station in step S416. Then, the wireless node 20 transmits the sensor signal using the selected frequency channel for the microcell base station in step S418.

Conversely, when the wireless node 20 fails to detect the reference pattern (NO in step S408), the control unit 250 decides the transmission energy to a maximum value of a range in which the transmission energy can be set in step S420. Accordingly, in step S422, the control unit 250 sets the transmission power and the packet transmission time length of the wireless communication unit 210 to predetermined values indicating maximum values of settable ranges. In step S424, the control unit 250 selects the frequency channel for the macrocell base station. Through the processes, the wireless node 20 sets the maximum transmission power and packet transmission time length in step S418 and transmits the sensor signal using the frequency channel for the macrocell base station.

When the sensor signal is transmitted with the macrocell base station set as a target, the control unit 250 may set the transmission power and the packet transmission time length to values other than the maximum values of the settable ranges. For example, the control unit 250 may set at least one of the transmission power and the packet transmission time length of the wireless communication unit 210 to a predetermined value indicating the maximum value of the settable range. Additionally, the control unit 250 may assume the base station 10 located within a predetermined distance from the wireless node 20 and set a predetermined value by which the base station 10 successfully receives the sensor signal.

The operation process of the wireless communication system 1 according to the embodiment has been described above. According to the embodiment, when the wireless node 20 is located in the microcell 13, it is possible to suppress the transmission energy and reduce the power consumption. Next, a radio resource selection method by the wireless communication system 1 will be described with reference to FIG. 16.

Figure 16:
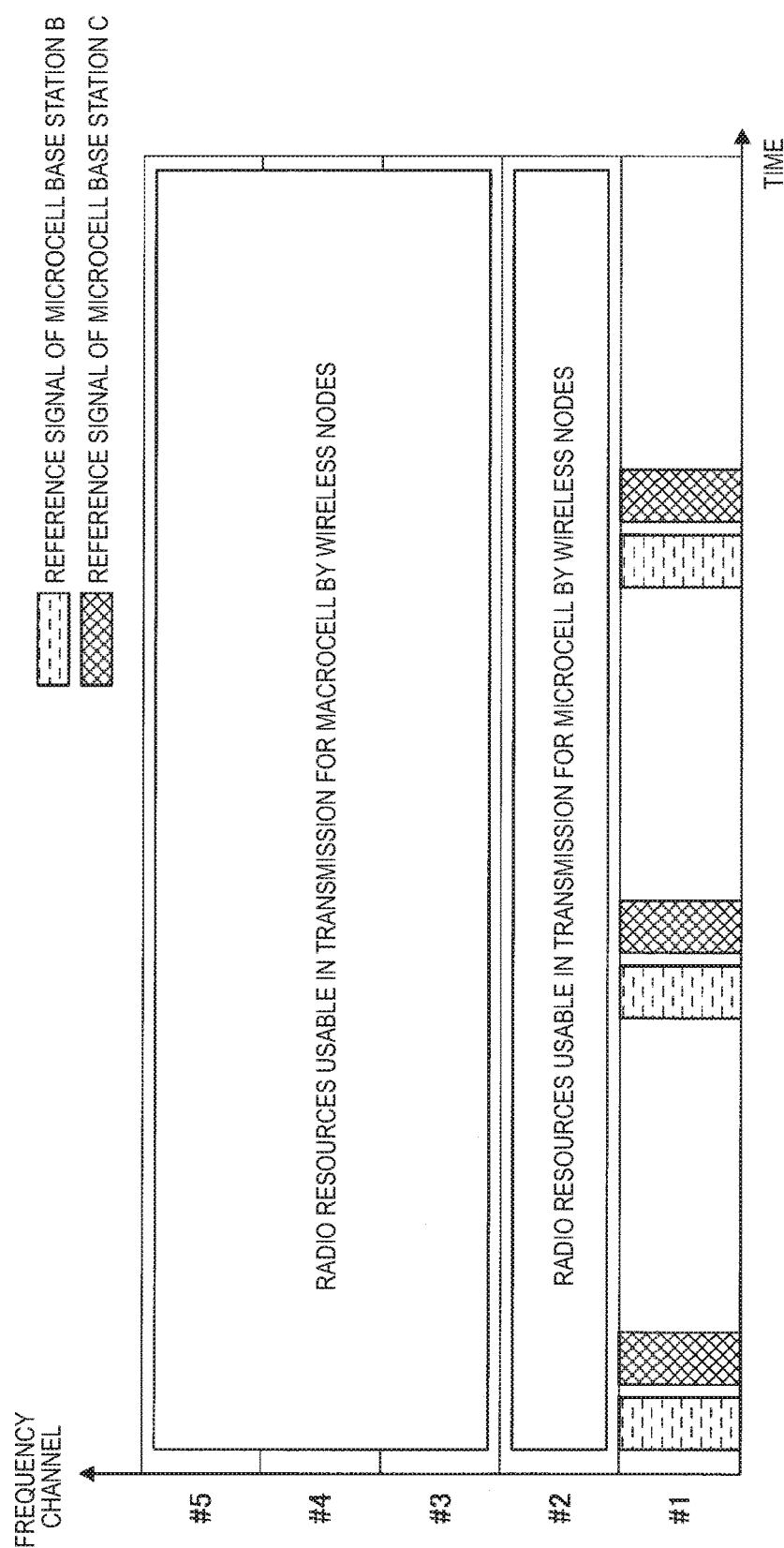
FIG. 16 is an explanatory diagram showing a radio resource selection method by a wireless communication system according to the third embodiment.

FIG. 16 is an explanatory diagram showing the radio resource selection method by the wireless communication system 1 according to the embodiment. FIG. 16 shows an example of the radio resources which can be used by the macrocell base station 10A, the microcell base stations 10B and 10C, and one or more wireless nodes 20 when only the microcell base stations 10B and 10C transmit the reference signals in the environment shown in FIG. 14. For example, it is assumed that 5 frequency channels are usable and time flows from the left to the right. Of course, any numbers of base stations 10 and wireless nodes 20 and any channel number and bandwidth of frequency channels can be used.

As described in FIG. 16, in the present selection method, the frequency channels to be used between the plurality of microcell base stations 10 are set to be the same and the transmission time slot to be used is divided. The wireless node 20 uses the different frequency channel from the frequency channels used by the microcell base stations 10. As described above, the control unit 250 causes the frequency channels used in the transmission of the wireless communication unit 210 to be different between when the measurement unit 220 successfully detects the reference pattern and when the measurement unit 220 fails to detect the reference pattern. Therefore, as illustrated in FIG. 16, the frequency channels used by the wireless node 20 are divided to frequency channel #2 for the microcell base station 10 and frequency channels #3, #4, and #5 for the macrocell base station 10. As described above, the sensor signal destined for the macrocell base station 10 is transmitted using the maximum transmission energy. Therefore, the reception level of the sensor signal in the microcell base station 10 can be larger for the macrocell base station 10 than for the microcell base station 10. Therefore, the frequency channels to be used are caused to be different for the microcell base station 10 and for the macrocell base station 10. This is because the microcell base station 10 avoids the failure of the reception of the sensor signal subjected to the transmission energy control for the microcell base station 10 because of the presence of the sensor signal destined for the macrocell base station 10. The wireless node 20 may cause the frequency channels used in the transmission of the wireless communication unit 210 to be different without causing the setting of the transmission energy to be different between when the measurement unit 220 successfully detects the reference pattern and when the measurement unit 220 fails to detect the reference pattern.

In a situation in which the microcells 13 do not overlap and no interference of the reference signals occurs, the same transmission time slot between the plurality of microcell base stations 10 may be reused. That is, the microcell base stations 10 in which the microcells 13 overlap use at least different transmission time slots.

(Modification Examples)

For example, in the embodiment, the macrocell base station 10 may also transmit the reference signal. In this case, the wireless node 20 can perform appropriate transmission energy control when transmitting the sensor signal destined for the macrocell base station 10. When the wireless node 20 fails to detect the reference pattern from both of the macrocell base station 10 and the microcell base station 10, the wireless node 20 transmits the sensor signal using the maximum transmission energy, as described above. In this case, the frequency channels used for the transmission for the macrocell base station 10 are preferably different between when the reference pattern from the macrocell base station 10 is successfully detected and when the reference pattern fails to be detected. This is because the macrocell base station 10 avoids the failure of the reception of the sensor signal subjected to the transmission energy control for the macrocell base station 10 because of the presence of the sensor signal transmitted with the maximum transmission energy. Therefore, the control unit 250 causes the frequency channels to be used for the transmission by the wireless communication unit 210 to be different between when the measurement unit 220 successfully detects the reference pattern from the macrocell base station and when the measurement unit 220 fails to detect the reference pattern.

In the embodiment, the base station 10 and the wireless node 20 can cause the frequency channels for the microcell base station 10 and the macrocell base station 10 to be different, and then can combine one of the second to fourth selection methods for the radio resources. For example, by combining the second selection method for the radio resources, the wireless node 20 may perform time synchronization with the base station 10, and then perform transmission for the microcell base station 10 or the macrocell base station 10 even on the frequency channel for the transmission of the reference signal. For example, by combining the third or fourth selection method for the radio resources, the base station 10 may transmit the reference signal in accordance with frequency-division multiplexing or code-division multiplexing.

The above-described second embodiment may be combined with the embodiment. For example, the wireless node 20 may reuse the same transmission setting as the transmission setting at the time of previous transmission when the position change is small.

<5. Application Examples>

The technology according to the present disclosure can be applied to various products. For example, the wireless node 20 may be realized as mobile terminals such as smartphones, tablet personal computers (PCs), notebook PCs, portable game terminals, or digital cameras, fixed-type terminals such as television receivers, printers, digital scanners, or network storages, or car-mounted terminals such as car navigation apparatuses. Further, the wireless node 20 may be realized as terminals (also referred to as machine type communication (MTC) terminals) which perform machine to machine (M2M) communication, such as smart meters, vending machine, remote monitoring apparatuses and point of sale (POS) terminals. Furthermore, the wireless node 20 may be wireless communication modules mounted in such terminals (for example, integrated circuit modules configured in one die).

For example, the base station 10 may be realized as a wireless LAN access point (which is also referred to as a wireless base station) that has no router function or has a router function. The base station 10 may be realized as a mobile wireless LAN router. Furthermore, the base station 10 may be wireless communication modules mounted in such devices (for example, integrated circuit modules configured in one die).

[5-1. First Application Example]

Figure 17:
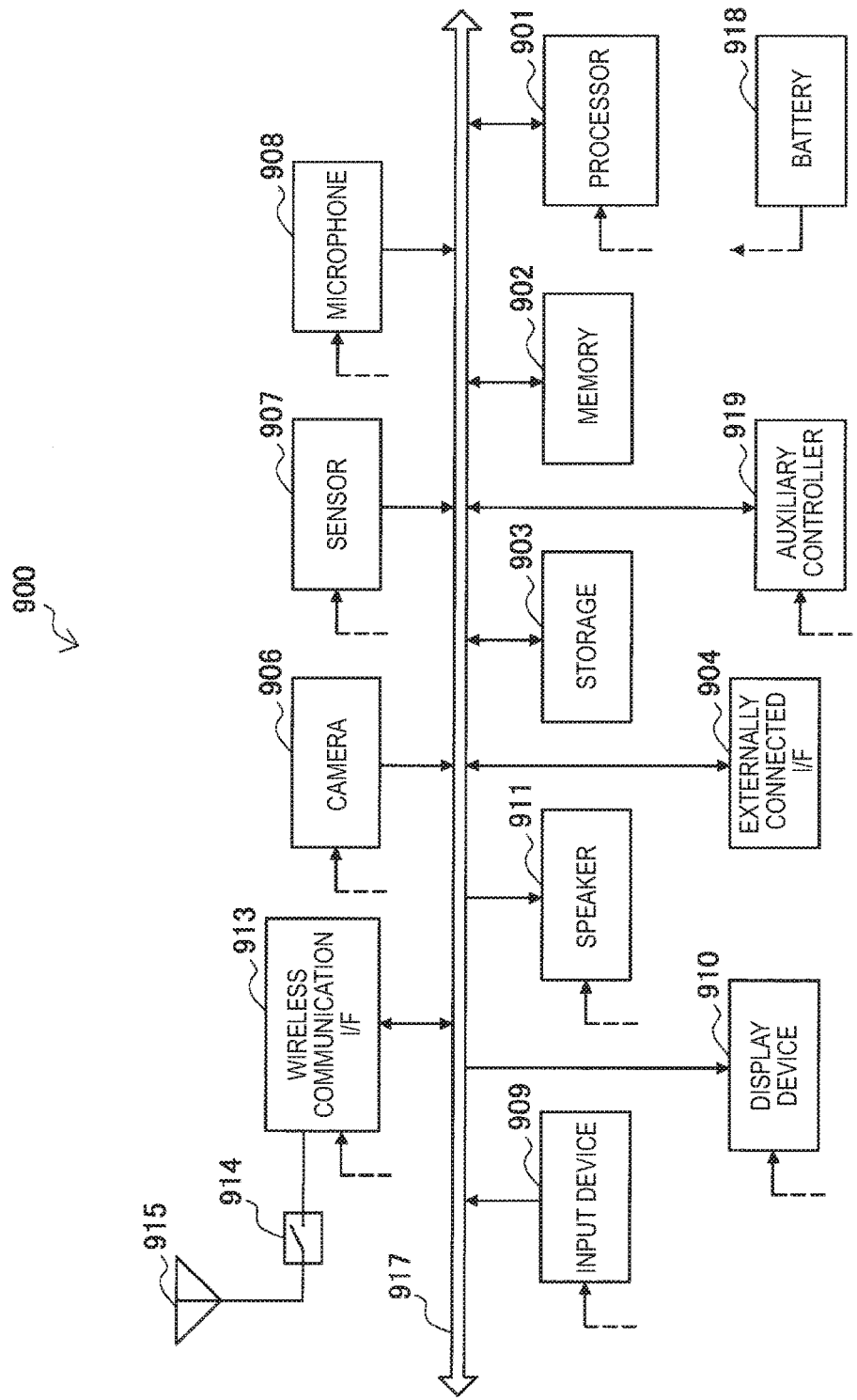
FIG. 17 is a block diagram showing an example of a schematic configuration of a smartphone.

FIG. 17 is a block diagram showing an example of a schematic configuration of a smartphone 900 to which the technology of the present disclosure can be applied. The smartphone 900 includes a processor 901, a memory 902, a storage 903, an externally connected interface 904, a camera 906, a sensor 907, a microphone 908, a input device 909, a display device 910, a speaker 911, a wireless communication interface 913, an antenna switch 914, an antenna 915, a bus 917, a battery 918, and an auxiliary controller 919.

The processor 901 may be, for example, a central processing unit (CPU) or a system on chip (SoC), and controls functions of an application layer and other layers of the smartphone 900. The memory 902 includes a random access memory (RAM) and a read only memory (ROM), and stores programs executed by the processor 901 and data. The storage 903 can include a storage medium such as a semiconductor memory or a hard disk. The externally connected interface 904 is an interface for connecting an externally attached device such as a memory card or a universal serial bus (USB) device to the smartphone 900.

The camera 906 has an image sensor, for example, a charge coupled device (CCD) or a complementary metal oxide semiconductor (CMOS) to generate captured images. The sensor 907 can include a sensor group including, for example, a positioning sensor, a gyro sensor, a geomagnetic sensor, an acceleration sensor, and the like. The microphone 908 converts sounds input to the smartphone 900 into audio signals. The input device 909 includes, for example, a touch sensor that detects touches on a screen of the display device 910, a key pad, a keyboard, buttons, switches, and the like to receive manipulations or information inputs from a user. The display device 910 has a screen such as a liquid crystal display (LCD), or an organic light emitting diode (OLED) display to display output images of the smartphone 900. The speaker 911 converts audio signals output from the smartphone 900 into sounds.

The wireless communication interface 913 supports one or more wireless LAN standards of IEEE 802.11a, 11b, 11g, 11n, 11ac, and 11ad to execute the wireless LAN communication. The wireless communication interface 913 can communicate with another apparatus via a wireless LAN access point in an infrastructure mode. In addition, the wireless communication interface 913 can directly communicate with another apparatus in a direct communication mode such as an ad hoc mode, Wi-Fi Direct, or the like. Wi-Fi Direct (registered trademark) is different from the ad hoc mode, and thus one of two terminals operates as an access point. However, communication is performed directly between the terminals. The wireless communication interface 913 can typically include a baseband processor, a radio frequency (RF) circuit, a power amplifier, and the like. The wireless communication interface 913 may be a single-chip module on which a memory that stores a communication control program, a processor that executes the program, and a relevant circuit are integrated. The wireless communication interface 913 may support another kind of wireless communication scheme such as a cellular communication scheme, a short-range wireless communication scheme, or a proximity wireless communication scheme in addition to the wireless LAN scheme. The antenna switch 914 switches a connection destination of the antenna 915 for a plurality of circuits (for example, circuits for different wireless communication schemes) included in the wireless communication interface 913. The antenna 915 has a single or a plurality of antenna elements (for example, a plurality of antenna elements constituting a MIMO antenna), and is used for transmission and reception of wireless signals from the wireless communication interface 913.

Note that the smartphone 900 may include a plurality of antennas (for example, antennas for a wireless LAN or antennas for a proximity wireless communication scheme, or the like), without being limited to the example of FIG. 17. In this case, the antenna switch 914 may be omitted from the configuration of the smartphone 900.

The bus 917 connects the processor 901, the memory 902, the storage 903, the externally connected interface 904, the camera 906, the sensor 907, the microphone 908, the input device 909, the display device 910, the speaker 911, the wireless communication interface 913, and the auxiliary controller 919 to one another. The battery 918 supplies electric power to each of the blocks of the smartphone 900 shown in FIG. 17 via power supply lines partially indicated by dashed lines in the drawing. The auxiliary controller 919 causes, for example, required minimum functions of the smartphone 900 to be operated in a sleep mode.

The smartphone 900 shown in FIG. 17 can operate as the wireless node 20. In this case, for example, the wireless communication unit 210, the measurement unit 220, the sensor unit 230, the data processing unit 240, the control unit 250, and the storage unit 260 shown in FIG. 5 may be mounted on the wireless communication interface 913. At least some of the functions may be mounted on the processor 901 or the auxiliary controller 919. Accordingly, the smartphone 900 can reduce power consumption of the battery 918 by controlling the transmission energy based on the measurement value of the reception power of the reference signal.

The smartphone 900 may operate as a wireless access point (software AP) when the processor 901 performs an access point function at an application level. The wireless communication interface 913 may have the wireless access point function.

[5-2. Second Application Example]

Figure 18:
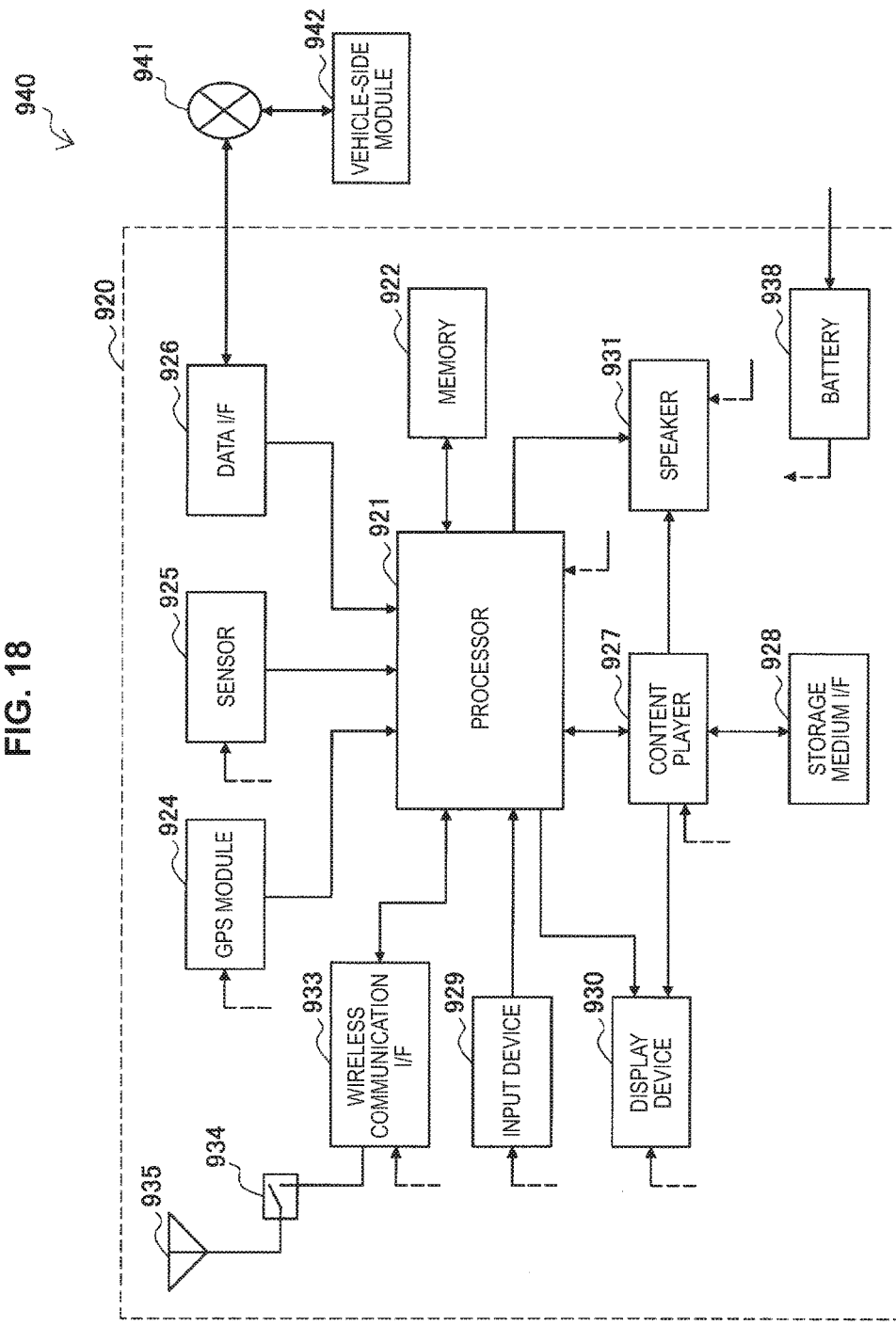
FIG. 18 is a block diagram showing an example of a schematic configuration of a car navigation device.

FIG. 18 is a block diagram showing an example of a schematic configuration of a car navigation apparatus 920 to which the technology of the present disclosure can be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, an antenna switch 934, an antenna 935, and a battery 938.

The processor 921 may be, for example, a CPU or an SoC controlling a navigation function and other functions of the car navigation apparatus 920. The memory 922 includes a RAM and a ROM storing programs executed by the processor 921 and data.

The GPS module 924 measures a position of the car navigation apparatus 920 (for example, latitude, longitude, and altitude) using GPS signals received from a GPS satellite. The sensor 925 can include a sensor group including, for example, a gyro sensor, a geomagnetic sensor, a barometric sensor, and the like. The data interface 926 is connected to an in-vehicle network 941 via, for example, a terminal that is not illustrated to acquire data generated on the vehicle side such as car speed data.

The content player 927 reproduces content stored in a storage medium (for example, a CD or a DVD) inserted into the storage medium interface 928. The input device 929 includes, for example, a touch sensor that detects touches on a screen of the display device 930, buttons, switches, and the like to receive manipulations or information inputs from a user. The display device 930 has a screen such as an LCD or an OLED display to display images of the navigation function or reproduced content. The speaker 931 outputs sounds of the navigation function or reproduced content.

The wireless communication interface 933 supports one or more wireless LAN standards of IEEE 802.11a, 11b, 11g, 11n, 11ac, and 11ad to execute wireless LAN communication. The wireless communication interface 933 can communicate with another apparatus via a wireless LAN access point in the infrastructure mode. In addition, the wireless communication interface 933 can directly communicate with another apparatus in a direct communication mode, such as an ad hoc mode, Wi-Fi Direct, or the like. The wireless communication interface 933 can typically have a baseband processor, an RF circuit, a power amplifier, and the like. The wireless communication interface 933 may be a single-chip module on which a memory that stores a communication control program, a processor that executes the program, and a relevant circuit are integrated. The wireless communication interface 933 may support another kind of wireless communication scheme such as a short-range wireless communication scheme, a proximity wireless communication scheme, or the cellular communication scheme in addition to the wireless LAN scheme. The antenna switch 934 switches a connection destination of the antenna 935 for a plurality of circuits included in the wireless communication interface 933. The antenna 935 has a single or a plurality of antenna elements and is used for transmission and reception of wireless signals from the wireless communication interface 933.

Note that the car navigation apparatus 920 may include a plurality of antennas, without being limited to the example of FIG. 18. In this case, the antenna switch 934 may be omitted from the configuration of the car navigation apparatus 920.

The battery 938 supplies electric power to each of the blocks of the car navigation apparatus 920 shown in FIG. 18 via power supply lines partially indicated by dashed lines in the drawing. In addition, the battery 938 accumulates electric power supplied from the vehicle.

The car navigation apparatus 920 shown in FIG. 18 can operate as the wireless node 20. In this case, for example, the wireless communication unit 210, the measurement unit 220, the sensor unit 230, the data processing unit 240, the control unit 250, and the storage unit 260 shown in FIG. 5 may be mounted on the wireless communication interface 933. At least some of the functions may be mounted on the processor 921. Thus, the car navigation apparatus 920 can reduce the power consumption of the battery 938 by controlling transmission energy based on a measurement value of the reception power of the reference signal.

The wireless communication interface 933 may operate as the above-described base station 10 and provide wireless connection to a terminal held by a user getting into a vehicle. At this time, for example, the wireless communication interface 933 can reduce power consumption of the terminal held by the user when the terminal held by the user communicates with the wireless communication interface 933 by transmitting the reference signal.

The technology of the present disclosure may be realized as an in-vehicle system (or a vehicle) 940 including one or more blocks of the above-described car navigation apparatus 920, the in-vehicle network 941, and a vehicle-side module 942. The vehicle-side module 942 generates vehicle-side data such as a vehicle speed, the number of engine rotations, or failure information and outputs the generated data to the in-vehicle network 941.

[5-3. Third Application Example]

FIG. 19 is a block diagram showing an example of a schematic configuration of a wireless access point 950 to which the technology according to the present disclosure is applied. The wireless access point 950 includes a controller 951, a memory 952, an input device 954, a display device 955, a network interface 957, a wireless communication interface 963, an antenna switch 964, and an antenna 965.

The controller 951 may be, for example, a CPU or a digital signal processor (DSP) and operates various functions (for example, access restriction, routing, encryption, firewall, and log management) of the internet protocol (IP) layer and higher layers of the wireless access point 950. The memory 952 includes a RAM and a ROM and stores various kinds of control data (for example, a terminal list, a routing table, an encryption key, security setting, and a log) and a program to be executed by the controller 951.

The input device 954 includes, for example, a button or a switch and receives a manipulation from a user. The display device 955 includes an LED lamp and displays an operation status of the wireless access point 950.

The network interface 957 is a wired communication interface that connects the wireless access point 950 to a wired communication network 958. The network interface 957 may include a plurality of connection terminals. The wired communication network 958 may be a LAN such as Ethernet (registered trademark) or may be a wide area network (WAN).

The wireless communication interface 963 supports one or more of wireless LAN standards such as IEEE 802.11a, 11b, 11g, 11n, 11ac, and 11ad and provides wireless connection as an access point to a nearby terminal. The wireless communication interface 963 can typically include a baseband processor, a radio frequency (RF) circuit, a power amplifier, and the like. The wireless communication interface 963 may be a single-chip module on which a memory that stores a communication control program, a processor that executes the program, and a relevant circuit are integrated. The antenna switch 964 switches a connection destination of the antenna 965 for a plurality of circuits included in the wireless communication interface 963. The antenna 965 has a single or a plurality of antenna elements, and is used for transmission and reception of wireless signals from the wireless communication interface 963.

The wireless access point 950 illustrated in FIG. 19 can operate as the base station 10. In this case, for example, the wireless communication unit 110, the data processing unit 120, the backbone communication unit 130, the control unit 140, and the storage unit 150 illustrated in FIG. 4 may be mounted on the wireless communication interface 963. At least some of the functions may be mounted on the controller 951. For example, the wireless communication interface 963 can acquire the measurement data without transmitting and receiving the control message from a terminal located in a cell administrated by the wireless access point 950 by transmitting the reference signal.

[6. Conclusion]

The embodiments of the technology according to the present disclosure have been described above with reference to FIGS. 1 to 19. According to the above-described embodiments, in the wireless node 20 performing the wireless communication with the base station 10, the reception power of the reference signal transmitted from the base station 10 is measured and at least one of the transmission power and the packet transmission time length is controlled based on the measured reception power. Accordingly, the wireless node 20 can perform the appropriate transmission setting singly irrespective of the control message from the base station 10, and thus it is possible to reduce power consumption related to the transmission and reception of the control message and the battery life of the wireless node 20 is prolonged. Since it is not necessary for the base station 10 to perform determination for the transmission energy control either, a processing load is reduced. Further, since the wireless node 20 can transmit the sensor signal using minimum transmission energy with which the base station 10 can successfully receive the sensor signal, the power consumption is reduced and the battery life is prolonged.

Under such control of the transmission energy, the reception levels of the sensor signals from the plurality of wireless nodes 20 are the same in the base station 10. The wireless node 20 can perform despreading on the signal received by the base station 10 to separate and acquire the measurement data by performing direct spreading on the measurement data by the spread code. Accordingly, the base station 10 realizes accommodation of many wireless nodes 20 with a constant communication quality.

The preferred embodiments of the present disclosure have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

The series of processes carried out by each apparatus described in the present specification may be realized by software, hardware, or a combination of software and hardware. Programs that compose such software may be stored in advance for example on a storage medium (non-transitory medium) provided inside or outside each apparatus. As one example, during execution by a computer, such programs are written into a random access memory (RAM) and executed by a processor such as a CPU.

Note that it is not necessary for the processes described in this specification with reference to the flowchart to be executed in the order shown in the flowchart. Some processing steps may be performed in parallel. Further, some of additional steps can be adopted, or some processing steps can be omitted.

In addition, the effects described in the present specification are merely illustrative and demonstrative, and not limitative. In other words, the technology according to the present disclosure can exhibit other effects that are evident to those skilled in the art along with or instead of the effects based on the present specification.

Additionally, the present technology may also be configured as below.

(1)

A wireless communication device including:

a wireless communication unit configured to perform wireless communication with a base station;

a measurement unit configured to detect a predetermined signal pattern from a signal received by the wireless communication unit and measure reception power of the signal including the predetermined signal pattern; and a control unit configured to control at least one of a packet transmission time length and transmission power when the wireless communication unit transmits a signal, based on pre-decided transmission power of the base station and the reception power measured by the measurement unit.

(2)

The wireless communication device according to (1), wherein the wireless communication unit directly spreads a transmission signal using a spread code.

(3)

The wireless communication device according to (2), wherein the control unit increases or decreases the packet transmission time length by changing a spread code length used by the wireless communication unit.

(4)

The wireless communication device according to any one of (1) to (3), wherein, based on a comparison result of the transmission power of the base station and the reception power measured by the measurement unit, the control unit controls at least one of the transmission power and the packet transmission time length of the wireless communication unit to satisfy a pre-decided reception power level serving as a standard of the base station.

(5)

The wireless communication device according to any one of (1) to (4), wherein, when the measurement unit detects a plurality of signals including the predetermined signal pattern, the control unit controls at least one of the transmission power and the packet transmission time length of the wireless communication unit based on highest reception power among reception powers measured in the plurality of signals.

(6)

The wireless communication device according to any one of (1) to (5), wherein, after occurrence of a transmission request, the control unit controls the wireless communication unit such that the wireless communication unit performs transmission after the measurement unit performs the measurement at least once.

(7)

The wireless communication device according to any one of (1) to (6), further including:

a positional information acquisition unit configured to acquire positional information indicating a position of the wireless communication device; and a first storage unit configured to store the reception power measured by the measurement unit in association with the positional information acquired at a time of the measurement by the positional information acquisition unit, wherein the control unit controls at least one of the transmission power of the wireless communication unit and the packet transmission time length based on the reception power stored in the first storage unit when a difference between a position indicated by the positional information acquired by the positional information acquisition unit and a position indicated by the positional information stored in the first storage unit is less than a threshold value.

(8)

The wireless communication device according to any one of (1) to (7), further including:

a notification unit configured to notify that the measurement unit fails to detect the predetermined signal pattern.

(9)

The wireless communication device according to any one of (1) to (7), wherein the control unit sets the transmission power and the packet transmission time length of the wireless communication unit to predetermined values when the measurement unit fails to detect the predetermined signal pattern.

(10)

The wireless communication device according to any one of (1) to (9), wherein the control unit causes frequency channels that the wireless communication unit uses for the transmission to be different between when the measurement unit successfully detects the predetermined signal pattern and when the measurement unit fails to detect the predetermined signal pattern.

(11)

The wireless communication device according to any one of (1) to (10), wherein the control unit controls the wireless communication unit such that radio resources not used by the base station are used in the transmission.

(12)

The wireless communication device according to any one of (1) to (11), wherein the measurement unit detects the predetermined signal pattern using a different transmission time slot for each base station.

(13)

The wireless communication device according to any one of (1) to (12), wherein the measurement unit detects the predetermined signal pattern using a frequency channel different for each base station.

(14)

The wireless communication device according to any one of (1) to (13), wherein the measurement unit detects the predetermined signal pattern which is different for each base station and has sufficiently small mutual correlation characteristics.

(15)

The wireless communication device according to (4) or any one of (5) to (14) that depend from (4), further including:

a second storage unit configured to store information indicating the pre-decided transmission power of the base station and the reception power level serving as the standard.

(16)

The wireless communication device according to any one of (1) to (15), further including:

a sensor unit configured to measure at least one of a position, temperature, pressure, acceleration, and biological information, wherein the wireless communication unit transmits information indicating a measurement result by the sensor unit to the base station.

(17)

A wireless communication method performed by a wireless communication device which performs wireless communication with a base station, the wireless communication method including:

detecting a predetermined signal pattern from a received signal and measuring reception power of the signal including the predetermined signal pattern; and controlling at least one of a packet transmission time length and transmission power when transmitting a signal, based on pre-decided transmission power of the base station and the measured reception power.

(18)

A wireless communication system including:
a base station; and
a wireless communication device,
wherein the base station includes
a first wireless communication unit configured to transmit a signal including a predetermined signal pattern to the wireless communication device, and
the wireless communication device includes
a second wireless communication unit configured to perform wireless communication with the base station,
a measurement unit configured to detect the predetermined signal pattern from the signal received by the second wireless communication unit and measure reception power of the signal including the predetermined signal pattern, and
a control unit configured to control at least one of a packet transmission time length and transmission power when the second wireless communication unit transmits a signal, based on pre-decided transmission power of the base station and the reception power measured by the measurement unit.

REFERENCE SIGNS LIST 1 wireless communication system
10 base station, macrocell base station, microcell base station
110 wireless communication unit
112 high-frequency switch
114 demodulation unit
116 reference signal transmission unit
120 data processing unit
130 backbone communication unit
140 control unit
150 storage unit
20 wireless node, wireless communication device
210 wireless communication unit
212 high-frequency switch
214 modulation unit
220 measurement unit
230 sensor unit
240 data processing unit
250 control unit
260 storage unit
11 cell
12 macrocell
13 microcell
30 management server
40 backbone communication path

The invention claimed is:

1. A wireless communication device comprising:
wireless communication circuitry configured to perform wireless communication with a base station; and
processing circuitry configured to
detect a predetermined signal pattern from a first signal received by the wireless communication circuitry and measure reception power of the first signal including the predetermined signal pattern,
determine transmission energy based on a default transmission energy, a standard reception power, and the measured reception power of the first signal,
control a packet transmission time length and transmission power of the wireless communication circuitry when the wireless communication circuitry transmits a second signal, based on the determined transmission energy,
identify second radio resources to transmit the second signal, the second radio resources being different from first radio resources used for the first signal, and
transmit the second signal using the second radio resources, the packet transmission time length and the transmission power of the wireless communication circuitry.

2. The wireless communication device according to claim 1, wherein the wireless communication circuitry directly spreads a transmission signal using a spread code.

3. The wireless communication device according to claim 2, wherein the the processing circuitry is further configured to
increase or decrease the packet transmission time length by changing a spread code length used by the wireless communication circuitry.

4. The wireless communication device according to claim 1, wherein, based on a comparison result of a pre-decided transmission power of the base station and the measured reception power, the processing circuitry is configured to control the transmission power of the wireless communication circuitry and the packet transmission time length of the wireless communication circuitry to satisfy the standard reception power.

5. The wireless communication device according to claim 1, wherein the processing circuitry is further configured to:
control the transmission power of the wireless communication circuitry and the packet transmission time length of the wireless communication circuitry based on highest reception power among a plurality of signals when a plurality of signals including the predetermined signal pattern is detected.

6. The wireless communication device according to claim 1, wherein, after occurrence of a transmission request, the processing circuitry is configured to control the wireless communication circuitry to perform transmission after the measurement is performed at least once.

7. The wireless communication device according to claim 1, further comprising:
location detection circuitry configured to acquire positional information indicating a position of the wireless communication device; and
a first memory configured to store the measured reception power in association with the positional information acquired at a time of the measurement by the location detection circuitry, wherein the processing circuitry is further configured to control the transmission power of the wireless communication circuitry and the packet transmission time length based on the measured reception power stored in the first memory when a difference between a position indicated by the positional information acquired by the location detection circuitry and a position indicated by the positional information stored in the first memory is less than a threshold value.

8. The wireless communication device according to claim 1, wherein the processing circuitry is further configured to:
generate a notification when the predetermined signal pattern is not detected.

9. The wireless communication device according to claim 1, wherein the processing circuitry is further configured to set the transmission power of the wireless communication circuitry and the packet transmission time length of the wireless communication circuitry to predetermined values when the predetermined signal pattern is not detected.

10. The wireless communication device according to claim 1, wherein the processing circuitry is further configured to cause frequency channels that the wireless communication circuitry uses for transmission to be different between when the predetermined signal pattern is detected and when the predetermined signal pattern is not detected.

11. The wireless communication device according to claim 1, wherein the processing circuitry is further configured to control the wireless communication circuitry such that radio resources not used by the base station are used in transmission.

12. The wireless communication device according to claim 1, wherein the processing circuitry is further configured to detect the predetermined signal pattern using a different transmission time slot for each base station.

13. The wireless communication device according to claim 1, wherein the processing circuitry is further configured to detect the predetermined signal pattern using a frequency channel different for each base station.

14. The wireless communication device according to claim 1, wherein the processing circuitry is configured to detect the predetermined signal pattern which is different for each base station.

15. The wireless communication device according to claim 4, further comprising:
a second memory configured to store information indicating the pre-decided transmission power of the base station and the standard reception power serving as the standard.

16. The wireless communication device according to claim 1, further comprising:
a sensor configured to measure at least one of a position, temperature, pressure, acceleration, and biological information, wherein the wireless communication circuitry transmits information indicating a measurement result by the sensor to the base station.

17. A wireless communication method performed by a wireless communication device which performs wireless communication with a base station, the wireless communication method comprising:
detecting a predetermined signal pattern from a first signal and measuring reception power of the first signal including the predetermined signal pattern;
determining transmission energy based on a default transmission energy, a standard reception power, and the measured reception power of the first signal;
controlling a packet transmission time length and transmission power of wireless communication circuitry when transmitting a second signal, based on the determined transmission energy;
identifying second radio resources to transmit the second signal, the second radio resources being different from first radio resources used for the first signal; and
transmitting the second signal using the second radio resources, the packet transmission time and the transmission power of the wireless communication circuitry.

18. A wireless communication system comprising:
a base station including first wireless communication circuitry configured to
transmit a first signal including a predetermined signal pattern to the wireless communication device; and
a wireless communication device including
second wireless communication circuitry configured to perform wireless communication with the base station, and
processing circuitry configured to
detect the predetermined signal pattern from the first signal received by the second wireless communication circuitry and measure reception power of the first signal including the predetermined signal pattern,
determine transmission energy based on a default transmission energy, a standard reception power, and the measured reception power of the first signal,
control a packet transmission time length and transmission power of the second wireless communication circuitry when the second wireless communication circuitry transmits a second signal, based on the determined transmission energy, identify second radio resources to transmit the second signal, the second radio resources being different from first radio resources used for the first signal, and
transmit the second signal using the second radio resources, the packet transmission time length and the transmission power of the second wireless communication circuitry.

* * * * *